US008218853B2

(12) United States Patent
Koizumi et al.

(10) Patent No.: US 8,218,853 B2
(45) Date of Patent: Jul. 10, 2012

(54) CHANGE DISCRIMINATION DEVICE, CHANGE DISCRIMINATION METHOD AND CHANGE DISCRIMINATION PROGRAM

(75) Inventors: Hirokazu Koizumi, Osaka (JP); Kazuo Kunieda, Osaka (JP); Kazuaki Hashizume, Osaka (JP)

(73) Assignee: NEC System Technologies, Ltd., Osaka (JP)

( * ) Notice: Subject to any disclaimer, the term of this patent is extended or adjusted under 35 U.S.C. 154(b) by 1312 days.

(21) Appl. No.: 11/493,894

(22) Filed: Jul. 27, 2006

(65) Prior Publication Data

US 2007/0025595 A1 Feb. 1, 2007

(30) Foreign Application Priority Data

Jul. 28, 2005 (JP) ................................. 2005-218921

(51) Int. Cl.
*G06K 9/00* (2006.01)
*G06K 9/66* (2006.01)
*G06K 9/32* (2006.01)

(52) U.S. Cl. ........ 382/154; 382/106; 382/108; 382/181; 382/195; 382/294

(58) Field of Classification Search .................. None
See application file for complete search history.

(56) References Cited

U.S. PATENT DOCUMENTS

| 2003/0086604 A1* | 5/2003 | Oniyama ....................... 382/154 |
| 2004/0041999 A1* | 3/2004 | Hogan et al. ................ 356/141.5 |
| 2004/0119859 A1* | 6/2004 | Nishio et al. .................. 348/252 |
| 2006/0114526 A1* | 6/2006 | Hasegawa ..................... 358/518 |

FOREIGN PATENT DOCUMENTS

| JP | 9-61164 | 3/1997 |
| JP | 2002-63580 | 2/2002 |
| JP | 2003-185433 | 7/2003 |
| JP | 2003185433 A * | 7/2003 |
| JP | 2004-117245 | 4/2004 |
| JP | 2004117245 A * | 4/2004 |
| WO | WO 2004084136 A2 * | 9/2004 |

* cited by examiner

*Primary Examiner* — Samir Ahmed
*Assistant Examiner* — Fred Hu
(74) *Attorney, Agent, or Firm* — Young & Thompson

(57) ABSTRACT

A change discrimination device capable of discriminating an alteration of a photographing target only from an aerial photograph or irrespectively of a difference in lighting conditions or photographing conditions at the time of taking a photo, and at minute distance intervals on a pixel basis, which receives input of a plurality of aerial image data at a new time point and an old time point, generates three-dimensional data (DSM) by subjecting the applied aerial image data to stereo-matching processing, generates ortho-image data and ortho-DSM data by normalizing the aerial image data and the generated DSM data, compares colors by using the generated ortho-image of the new time point and ortho-image of the old time point and compares heights by using the generated ortho-DSM data of the new time point and ortho-DSM data of the old time point to discriminate an alteration of a feature on the earth.

33 Claims, 31 Drawing Sheets

100a IMAGE

100b IMAGE

CHANGE DISCRIMINATION DEVICE, CHANGE DISCRIMINATION METHOD AND CHANGE DISCRIMINATION PROGRAM

BACKGROUND OF THE INVENTION

1. Field of the Invention

The present invention relates to a change discrimination device which detects and discriminates a change of a target including a feature on the earth, and more particularly, to a change discrimination device, a change discrimination method and a change discrimination program for detecting and discriminating a change of targets including features on the earth such as houses, structures, vehicles, roads, grounds and forests.

2. Description of the Related Art

Discrimination of a change (alteration) of a feature on the earth is required for grasping a state of a geographical change and a land use state. Features on the earth here include all, natural or artificial, objects on the earth such as grounds, forests, houses, structures, roads and vehicles. Although in the following, description will be made of discrimination of a change (alteration) of structures including houses, warehouses, factories and schoolhouses, the same description is applicable to discrimination of a change of grounds, forests and vehicles, and discrimination of a change of a feature on the earth is not limited to discrimination of alteration of a structure.

Alteration of a structure here represents a change caused by a loss of a structure, expansion/reform of a structure, new construction of a structure after destruction of a structure (new construction after destruction) and moving to or new construction at a lot with no buildings on it.

Among discriminations of an alteration of a feature on the earth, discrimination of an alteration of fixed assets such as structures including, for example, houses, warehouses, factories and schoolhouses is required to be accurate because they are taxable targets.

In addition, discrimination of an alteration of fixed assets is preferably automated for efficient work and labor-saving.

Examples of conventional methods for discriminating a change of a feature on the earth are recited, for example, in Japanese Patent Laying-Open No. 9-61164 (Literature 1) and Japanese Patent Laying-Open No. 2004-117245 (Literature 2).

Literature 1 recites the change discrimination support system for land use state and house shape which executes relative orientation, with one projectively transformed, two aerial photographs that are transformed into digital image data to each other and displays the image data having being projectively transformed in comparison, thereby reliably and efficiently executing discrimination of an alteration of fixed assets and entry of a kind of alteration by comparison of aerial photographs.

Literature 2, for example, recites the house alteration discriminating method which, with respect to each laser data including ground positional information and altitude information obtained for a predetermined region from the sky at two, new and old time points, enables automatic discrimination of an alteration of a house by sampling the altitude information on a mesh set based on the ground positional information to set a representative altitude value on each square of the mesh, and determining whether a house alters or not at the two, new and old time points, based on the number of squares to be discriminated in which a difference between representative altitude values of the squares at the new and old time points exceeds a threshold value set to be approximately one floor high.

The above-described conventional techniques, however, have the shortcomings set forth in the following.

According to the conventional art whose example is Literature 1, a kind of change of a height of a feature on the earth can not be discriminated. It is accordingly impossible to discriminate expansion of a structure in which the height of the structure is increased and reduction of a structure in which the height of the structure is decreased.

The reason is that image data as a target for change detection fails to include height information.

Another problem is that automatic detection of a change of a feature on the earth can not be executed with high precision.

The reason is that although image data as a target for change detection has color information, because even if no feature on the earth changes, a color change due to accumulated snow or a difference in a position of a shadow, for example, is detected to erroneously determine that a change occurs, an operator needs to confirm the determination.

In addition, taking aerial photographs at new and old time points from completely the same position is impossible and even if no change occurs, the same feature on the earth such as the same structure is erroneously determined to have a change because it is differently seen due to a difference in photographing conditions such as a scale, a focal length, an altitude and a photographing course.

Furthermore, according to the conventional art whose example is Literature 2, while a kind of change in a height of a feature on the earth can be discriminated, a change of a feature on the earth can not be detected to have a highly precise positional resolution.

The reason is that because laser data has a distance interval between required measurement points as long as several meters at the time of detecting a change in height and a distance interval between measurement points is not constant due to radial emission of laser, precise detection of a change of a feature on the earth is impossible at minute distance intervals.

A further problem is that a change of a structure having no change in height such as a structure newly constructed after destruction can not be detected.

The reason is that a change of a feature on the earth is detected only by height information.

A still further problem is cost higher than that required in detecting a change of a feature on the earth based only on an aerial photograph.

The reason is that when detecting a change of a feature on the earth to high precision, in addition to discrimination by a change in height, discrimination by a color change is indispensable and for that discrimination, an aerial photograph taken in the air is required in addition to laser data.

An object of the present invention is to solve the above-described problems of the conventional art and provide a change discrimination device, a change discrimination method and a change discrimination program which enable a change of a target including a feature on the earth to be discriminated while suppressing costs for change detection.

SUMMARY OF THE INVENTION

In order to attain the above-described object, the change discrimination device according to the present invention, which is a change discrimination device for discriminating a change of a target within a predetermined region based on image data obtained by photographing the predetermined region, includes a stereo processing unit for executing stereo processing with a plurality of images of a predetermined region as an input which are photographed at a plurality of different spots at a first time point and a second time point after the first time point to extract three-dimensional data at the first time point and the second time point, an orthorectification unit for executing, by using three-dimensional data obtained at the first time point and the second time point which is extracted by the stereo processing unit, orthogonal projective transformation with respect to the images photographed and the three-dimensional data at the first time point and the second time point, thereby extracting ortho-image and ortho three-dimensional data at the first time point and the second time point, and a change discrimination unit for discriminating an alteration of the target from the ortho-image and the ortho three-dimensional data at the first time point and the second time point which are extracted by the orthorectifying unit.

According to another aspect of the invention, a change discrimination method of discriminating, from image data obtained by photographing a predetermined region, a change of a target included in said predetermined region, comprises a stereo processing step of executing stereo processing with a plurality of images of a predetermined region as an input which are photographed at a plurality of different spots at a first time point and a second time point after the first time point to extract three-dimensional data of said first time point and said second time point, an orthorectification step of, using the three-dimensional data of the first time point and said second time point extracted at said stereo processing step, executing orthogonal projective transformation of the images photographed respectively at said first time point and said second time point and said third-dimensional data to extract ortho-images and ortho three-dimensional data of said first time point and said second time point, and a change discrimination step of discriminating a change of said target based on the ortho-images and said ortho three-dimensional data of said first time point and said second time point extracted at said orthorectification step.

According to a further aspect of the invention, a change discrimination program which runs on a computer device to discriminate, from image data obtained by photographing a predetermined region, a change of a target included in said predetermined region, which causes said computer device to execute processing of executing stereo processing with a plurality of images of a predetermined region as an input which are photographed at a plurality of different spots at a first time point and a second time point after the first time point to extract three-dimensional data of said first time point and said second time point, processing of, by using the extracted three-dimensional data of the first time point and said second time point, executing orthogonal projective transformation of the images photographed respectively at said first time point and said second time point and said third-dimensional data to extract ortho-images and ortho three-dimensional data of said first time point and said second time point, and processing of discriminating a change of said target based on the ortho-images and said ortho three-dimensional data of said first time point and said second time point extracted.

With such a structure as described above, a change of a target is detected only from an image, so that a change of a target can be detected at low costs to attain the object of the present invention.

The following effects can be attained by the present invention.

First, since a change of a target is discriminated by using a height change obtained by subjecting image data to stereo processing and orthorectification processing, discrimination of a change of a target can be made at low costs.

Secondly, since change is discriminated with a pixel of an image or an ortho-image excluded from a region whose change is discriminated, the pixel whose hue and luminance reside within a fixed region, a change of a target can be discriminated irrespectively of a difference in lighting conditions at the time of image photographing and a difference in photographing conditions.

Thirdly, since a change is discriminated by comparing colors or tones of orthorectified image data, a change of a target whose height has no change can be discriminated.

Fourthly, since the present invention discriminates a change in height on an image pixel basis by using stereo processing, a change of a target can be discriminated at minute distance intervals on a pixel basis.

Fifthly, since the present invention discriminates a change of a target by using a change in height obtained by subjecting image data to stereo processing and orthorectifying processing and a change in color obtained by orthorectifying image data, discrimination of a change of a target can be made at low costs and with high precision.

Therefore, the present invention enables the above-described conventional technical problems to be solved to discriminate a change of a target with costs reduced.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the following, best modes for implementing the present invention will be described.

In the present invention, a change of a feature on the earth is detected from a plurality of image data obtained by photographing a predetermined region from the sky at different time points.

In the present invention, among different time points, a time point whose time is relatively in the future will be described as a new time point and a time point whose time is relatively in the past will be described as an old time point.

(First Embodiment)

In the following, the first embodiment of the present invention will be described with reference to the drawings. In the present embodiment, description will be made of discrimination of a change of a certain structure (discrimination of an alteration of a structure) as one of features on the earth. Discrimination of alterations of other features on the earth such as roads, vehicles, grounds and forests can be executed also by the same method.

(Structure of First Embodiment)

Figure 1:
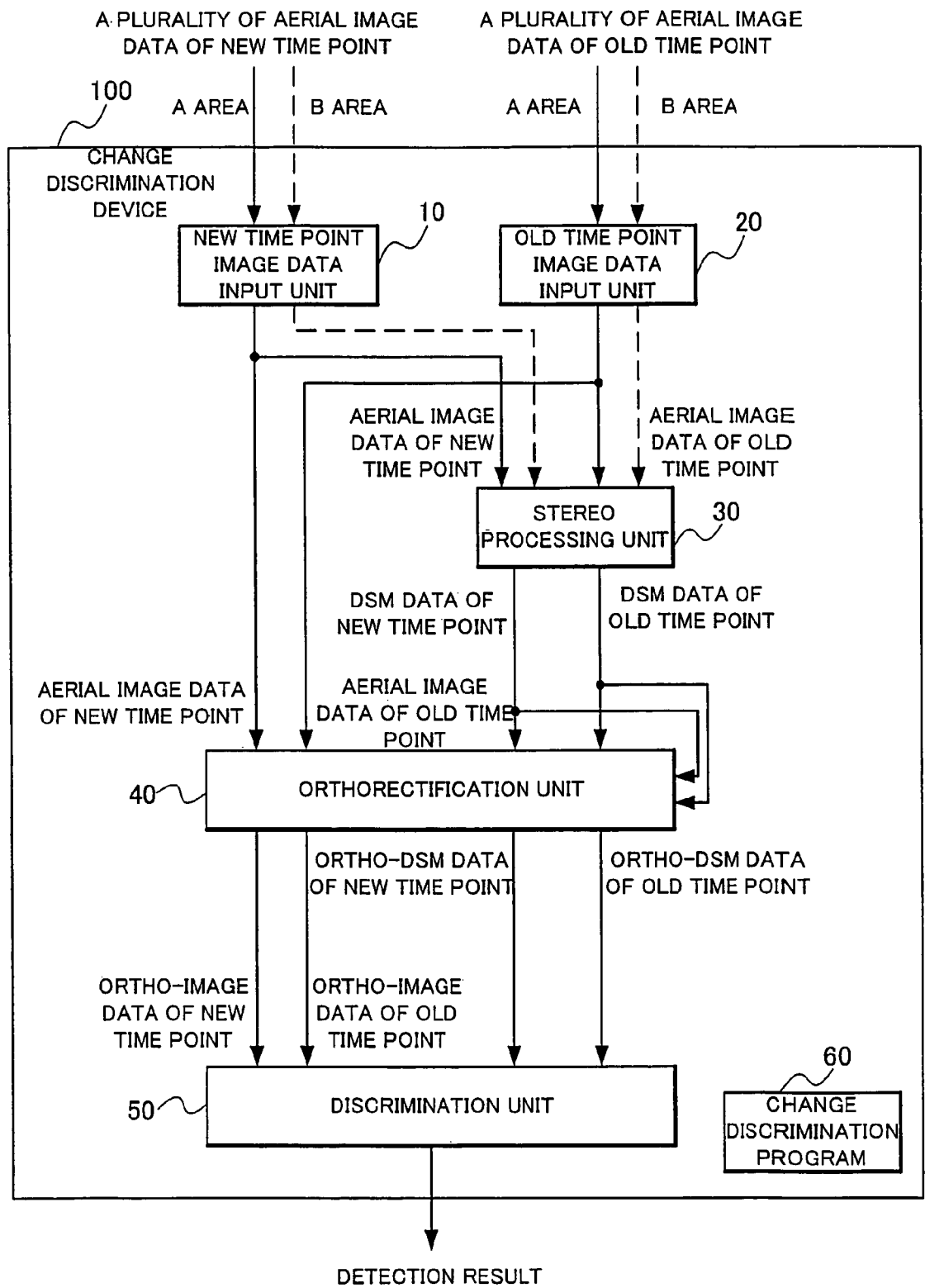
FIG. 1 is a block diagram showing one example of a structure of a change discrimination device according to a first embodiment of the present invention.

FIG. 1 is a block diagram showing a structure of a change discrimination device 100 according to the present embodiment.

With reference to FIG. 1, the change discrimination device 100 according to the present embodiment includes a new time point image data input unit 10, an old time point image data input unit 20, a stereo processing unit 30, an orthorectification unit 40, a discrimination unit 50 and a change discrimination program 60.

The new time point image input unit 10, which has a function of receiving input of image data of a new time point, receives input of a plurality of pieces of aerial image data obtained by photographing at a new time point.

The old time point image input unit 20, which has a function of receiving input of image data of an old time point, receives input of a plurality of pieces of aerial image data obtained by photographing at an old time point.

The stereo processing unit 30, which has a function of generating three-dimensional data, executes stereo-matching processing with respect to a plurality of pieces of aerial image data of the same time point to generate three-dimensional data (DSM (Digital Surface Model) data).

The orthorectification unit 40 has a function of executing orthorectification processing with respect to image data and DSM data for normalizing image data and DSM data and further executing absolute orientation with respect to orthorectified image data and DSM data.

More specifically, the orthorectification unit 40 executes orthogonal projective transformation of the aerial image data and the DSM data by using the DSM data and further executes absolute orientation to generate ortho-image data and ortho-DSM data corresponding the respective data.

As will be described later, the ortho-image data includes color data and data of a latitude and a longitude by absolute orientation and on the other hand, the ortho-DSM data includes height data having a latitude value including a height of a surface of a feature on the earth and data of a latitude and a longitude by absolute orientation.

Although as data included in the ortho-image data and the ortho-DSM data, data of a latitude and a longitude has been described, these data is not limited to data of a latitude and a longitude and it may be data of a coordinate value represented by other coordinate system.

Furthermore, as data that height data included in the ortho-DSM data has, an altitude value has been described, the data that the height data has is not limited to the altitude value and may be a value indicative of a relative height from other basis.

The reason why DSM data output from the stereo processing unit 30 is branched into two and applied to the orthorectification unit 40 in FIG. 1 is that one of the two branched data is used as DSM data for use in orthogonal projective transformation and the other data is used as DSM data as a target of orthogonal projective transformation.

Here, orientation represents processing of obtaining a predetermined value with respect to a target to be evaluated.

In addition, absolute orientation represents processing of obtaining actual coordinates (proper position) of image data and the like with respect to the earth and in the present embodiment, it represents processing of obtaining a longitude and a latitude of aerial image.

Since execution of the processing obtains latitudes and longitudes of aerial images of a new time point and an old time point, the same spot in the respective aerial images can be correlated with each other.

By mutually correlating the same spots at a new time point and an old time point based on the obtained aerial images enables the discrimination unit 50 which will be described later to compare a color and a height at the same spot and detect a change in color and height of the same structure, for example.

Method of executing absolute orientation in the present embodiment has no limitation and it may be a common method.

As a method of executing absolute orientation, for example, an expression may be obtained for transformation from image coordinates at a plurality of points on an aerial image from which a longitude, a latitude and an altitude value (image coordinates) are detected in advance into ground coordinates (a longitude, a latitude and an altitude value) on the ground surface.

As a further method of executing absolute orientation, for example, aerial triangulation data may be used as data of a longitude, a latitude and an altitude measured by taking an aerial photograph with an aerial marking photographed. By adopting this method, ground coordinates at arbitrary coordinates on the image can be obtained.

Here, an aerial marking represents a marking whose shape can be clearly recognized on an image when the image is photographed by various kinds of sensors on an air plane and whose image coordinates can be measured. Therefore, a point at which an aerial marking is placed has accurate three-dimensional coordinates (proper position).

The discrimination unit 50 has a function of comparing colors by using ortho-image data at a new time point and ortho-image data at an old time point, a function of comparing heights by using ortho-DSM data at a new time point and ortho-DSM data at an old time point and a function of discriminating an alteration of a structure based on the above-described functions.

The change discrimination program 60 is mounted as hardware on a circuit part to realize each function of the above-described components of the change discrimination device 100 or is executed as software on a computer processing device to realize the same.

Next, main terms used in the above description will be explained with reference to the drawings.

Here, an aerial image is an image of an aerial photograph which is transformed into an digital image.

Figure 32:
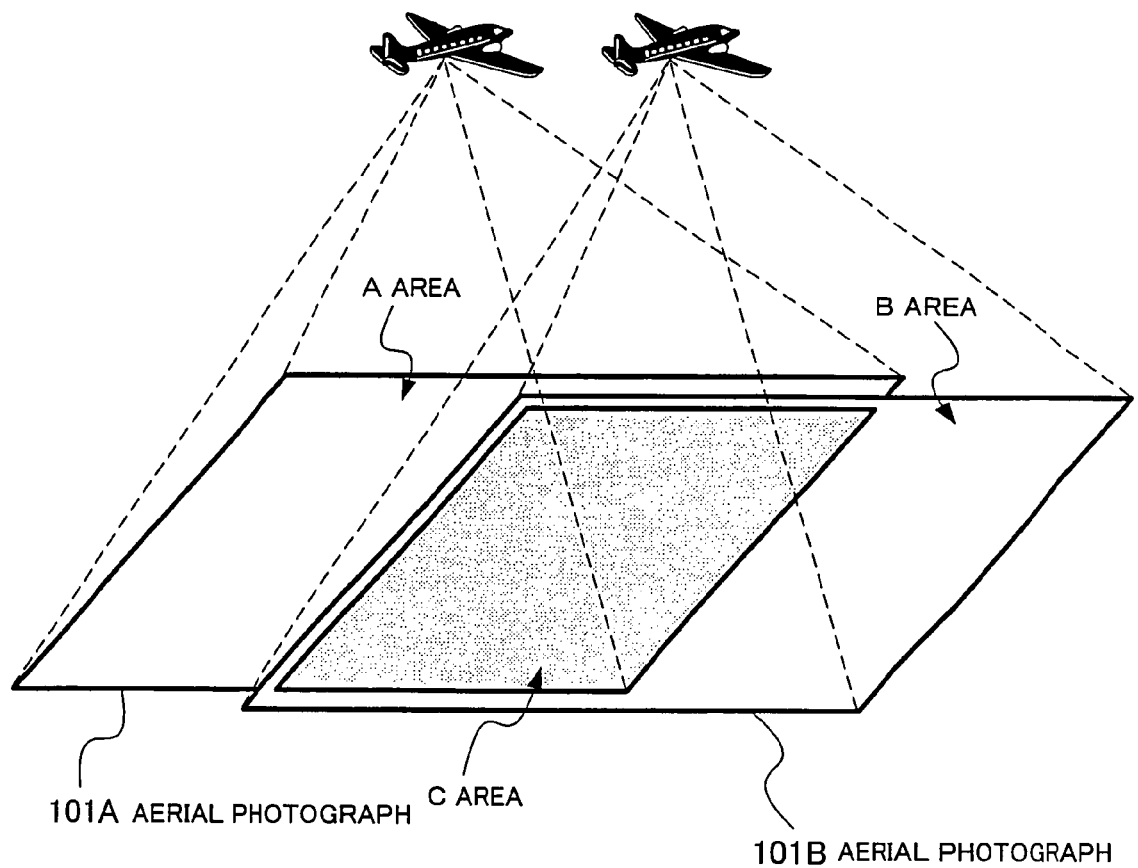
FIG. 32 is a schematic view showing a relationship among a plurality of aerial image photographing ranges.
Figure 33:
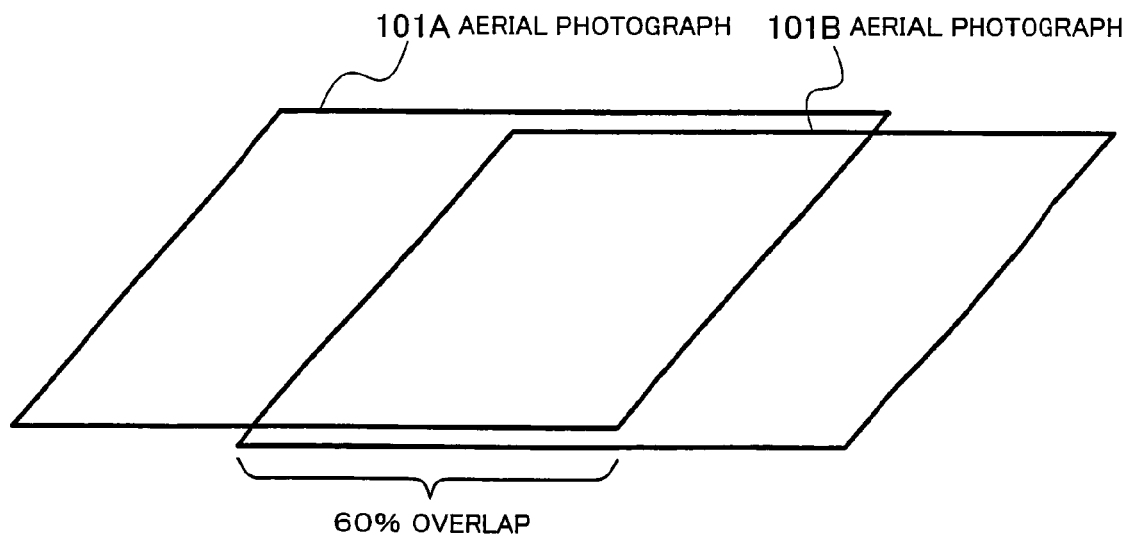
FIG. 33 is a schematic view showing a relationship among a plurality of aerial image photographing ranges.

FIG. 32 and FIG. 33 are diagrams showing one example of an aerial photograph to be digitally transformed into an aerial image.

The aerial photographs shown in FIGS. 32 and 33 include an aerial photograph 101A obtained by successively photographing an A area from an air plane in the sky and an aerial photograph 101B obtained by successively photographing a B area. The aerial photograph 101A and the aerial photograph 101B are taken 60% overlapping (C area) with each other in the flying direction of the air plane.

The present embodiment is assumed to be a mode which is to be applied to a case where photographing ranges of aerial photographs at a new time point and an old time point coincide.

A mode to be applied to a case where photographing ranges of aerial photographs at a new time point and an old time point fail to completely coincide will be described later.

Although an aerial image in the present embodiment is an image generated by digitally transforming an aerial photograph whose example is the aerial photograph 101A or the aerial photograph 101B, the image is one example only of an image to which the present invention is applied. An image to which the present invention is applied is not limited to an aerial image and may be an image obtained from a digitalized satellite photograph, a digital image of a photograph taken by a common digital camera, a digital image obtained by digitalizing, by scanning, an analog photograph taken by a common analog camera or the like.

In addition, an aerial image, when photographed with a scan resolution of 1200 dpi and 1/5000 of scale as one of common photographing conditions, has its resolution attaining 12.5 cm/pixel which is a higher resolution than that of laser data.

Stereo-matching processing here represents processing of obtaining a corresponding point in each image which picks up the same spot among a plurality of images photographed from different viewpoints to obtain a length to a target or a shape of the same based on the principle of triangulation by using its parallax.

More specifically, since in a pair of the aerial photograph 101A and the aerial photograph 101B, positions of a corresponding feature on the earth have a predetermined positional deviation (parallax), the stereo-matching processing enables height data having an altitude value including a height of a surface of the feature on the earth to be obtained by measuring the positional deviation.

Although there exist various methods of executing stereo-matching processing such as obtaining the amount of common features to correlate positions to each other, obtaining correlation of right and left images and the like, no limitation is imposed on a method used in the stereo-matching processing in the present embodiment. The stereo-matching processing recited in Japanese Patent Publication No. 8-16930 may be used, for example.

DSM data here includes height data having the above-described altitude value obtained by the stereo-matching processing. DSM data therefore includes height data of an uppermost surface of a structure, for example.

The above-described deviation is in general measured from a position at which among two images, in general, image correlation made between corresponding small regions nearby has the largest correlation coefficient, and the image correlation is made with respect to the whole images obtained to execute planar measurement of an altitude value for each square shape at fixed intervals, thereby generating DSM data.

Orthorectification here represents normalization processing by orthogonal projective transformation, which includes processing of generating ortho-image data from image data and processing of generating ortho-DSM data from DSM data. Orthorectification in general includes orthorectification of correcting only geographical features and true orthorectification of correcting structures as well, and it represents the latter, true orthorectification, in the present embodiment.

Orthorectification in the present embodiment also includes processing of absolute orientation executed by the orthorectification unit 40.

Ortho-image here represents an image which is subjected to normalization processing and obtained by absolute orientation.

Figure 30:
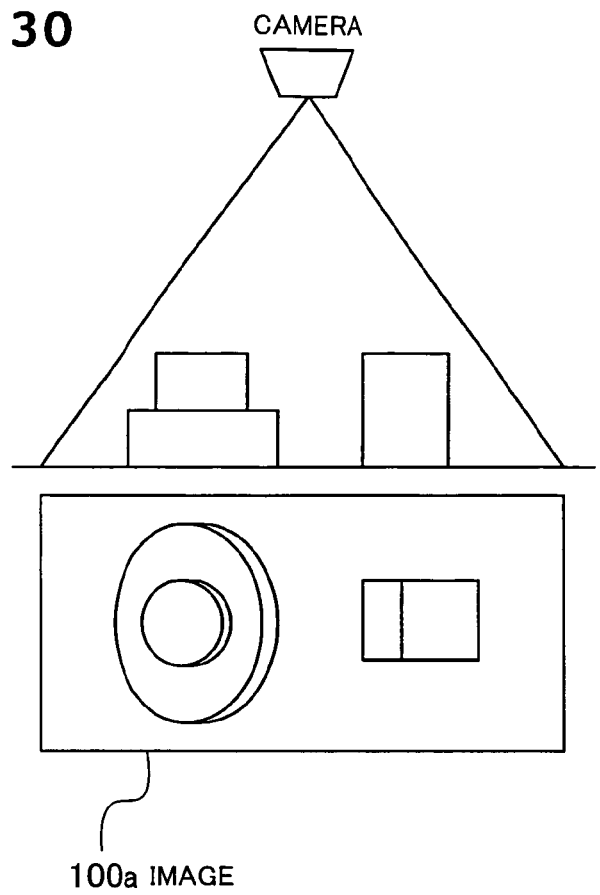
FIG. 30 is a schematic view showing a central projected image.
Figure 31:
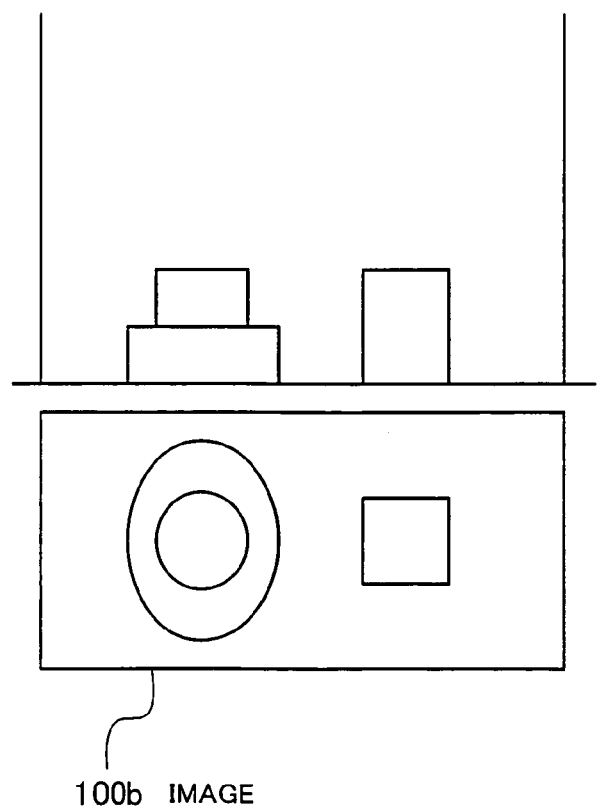
FIG. 31 is a schematic view showing an orthophotographic image.

FIG. 30 and FIG. 31 are diagrams for use in explaining normalization processing of an image, FIG. 30 being a diagram for use in explaining center projection and FIG. 31 being a diagram for use in explaining orthogonal projection.

The upper side of the figure in FIG. 30 shows how an object is photographed by a camera and the lower side of the figure is a view showing an image obtained by the photographing.

In a case of center projection, while at the center of an image, the image is photographed as seen from right above, because the image is concentrated on one point, an image out of the center is photographed to incline.

Furthermore, in a case of center projection, due to a round shape of the earth and ups and downs of geography, an image might be photographed to further incline in some cases.

In a case of center projection, therefore, it is difficult to precisely correlate and compare images photographed under different conditions.

More specifically, in a case of center projection, even when absolute orientation is executed, because of deviation of a position of a building rooftop from a right position, for example, the height of the rooftop deviates from a height at the right position, so that it is difficult to calculate a difference in height or color at the same position of images to be compared.

The upper side of the figure of FIG. 31 shows a state of orthogonal projection and the lower side of the figure is a view showing an image obtained by orthogonal projection.

In a case of orthogonal projection, as illustrated in the lower side of the figure, because an image is normalized and transformed into a right position, measurement of a position and a distance can be executed to high precision.

In a case of an ordinary camera, in an image 100a, a target is photographed to incline because of center projection and ups and downs of geography as shown in FIG. 30. Therefore, as shown in FIG. 31, by normalizing the image 100a by projecting orthogonally to a predetermined surface, an image 100b is generated taking ups and downs of geography and the like into consideration.

While with ordinary aerial images, comparison between the images at the same position is difficult because a photographing position varies at a new time point and an old time point, with the image 100b generated by normalization processing, because it has a right position obtained by absolute orientation, linking a plurality of images 100b enables a target to be grasped in a wide range to generate a drawing or the like.

In other words, executing absolute orientation with respect to the image 100b obtains an ortho-image having right longitude and latitude corresponding to the image 100b to compare the images with each other.

Ortho-DSM data here, similarly to an ortho-image, represents data obtained by subjecting DSM data to normalization processing and executing absolute orientation.

More specifically, ortho-DSM data in a case of an ordinary camera is data generated, corresponding to an image obtained by subjecting a target photographed inclining due to center projection and ups and downs of geography and the like as shown in FIG. 30 to normalization processing and absolute orientation, by absolute orientation data which is obtained by projecting DSM data orthogonally to a predetermined surface as shown in FIG. 31.

While with ordinary DSM data, because it has a deviation at various spots from a proper position due to central projection, ups-and-downs of geography and the like to fail to obtain data of a right height, height comparison is difficult, with ortho-DSM data, because of execution of orthogonal transformation and further execution of absolute orientation to have a right position composed of a longitude, a latitude and a height corresponding to DSM data, heights in the respective data can be compared with each other.

Figure 2:
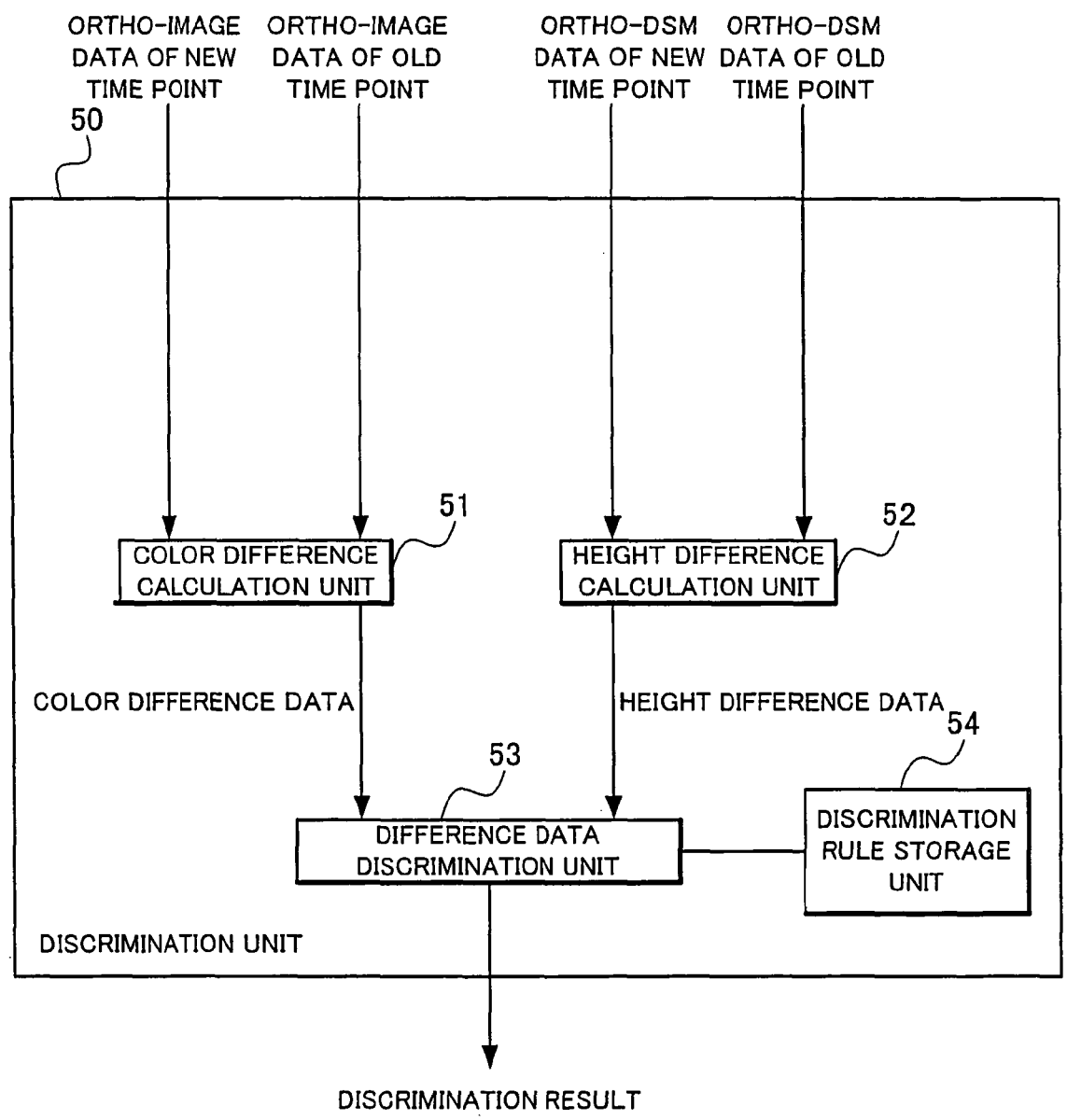
FIG. 2 is a block diagram showing one example of a discrimination unit of the change discrimination device according to the first embodiment.

FIG. 2 is a block diagram showing a structure of the discrimination unit 50 according to the present embodiment.

With reference to FIG. 2, the discrimination unit 50 according to the present embodiment includes a color difference calculation unit 51, a height difference calculation unit 52, a difference data discrimination unit 53 and a discrimination rule storage unit 54.

The color difference calculation unit 51 is a calculation unit for calculating a color difference, which has a function of extracting a difference between colors of the same position at a new time point and an old time point from an ortho-image of the new time point and an ortho-image of the old time point.

The height difference calculation unit 52 is a calculation unit for calculating a height difference, which has a function of extracting a difference between heights at the same position at a new time point and an old time point from ortho-DSM data of the new time point and ortho-DSM data of the old time point.

The difference data discrimination unit 53 has a function of discriminating a change of a structure to be discriminated by integrally using color difference data as information about a color change of a structure and height difference data as information about a height change of a structure which are extracted by the color difference calculation unit 51 and the height difference calculation unit 52, respectively (alteration discriminating processing).

In addition, the difference data discrimination unit 53 outputs a result of the processing of discriminating an alteration after the alteration discriminating processing is executed.

Among discrimination result output form is a difference image of each kind of alterations or a list file in which a position and a kind of structure or the like where an alteration occurs is described.

Among discrimination result display forms are overlay-display of various kinds of difference images on an ortho-image and list-display of a position and a kind of structure or the like where an alteration occurs.

When a difference image is used, for example, overlay-displaying a difference image indicative of new construction as red, a difference image indicative of destruction as blue and a difference image indicative of a color change as green on an ortho-image enables a position and a kind of a structure or the like where an alteration occurs to be confirmed on the ortho-image.

When a list is used, for example, with a list of structures determined to have an alteration displayed, upon selection of a structure from the list by a user, displaying an ortho-image corresponding to a position of the selected structure as the center and displaying a marking at the position of a structure determined to have an alteration enables the structure determined to have the alteration to be confirmed on the ortho-image.

The position of a structure determined to have an alteration is the center position of a circumscribed rectangular frame of a difference image. Alternatively, a position of the center of gravity may be a position of the structure determined to have the alteration. Further alternatively, a range of the circumscribed rectangular frame (position such as upper end, lower end, left end and right end) may be a position of the structure determined to have the alteration.

Form of a position of a structure whose alteration is determined is an image coordinate. It may be longitude and latitude values.

When the form of a position of a structure whose alteration is determined is set to be longitude and latitude values, at the time of displaying the structure whose alteration is determined, an image coordinate value of the structure whose alteration is determined is calculated from an image coordinate value and a longitude and latitude value of an input point which are given in advance. In a case where image coordinate values and longitude and latitude values at three points are given, for example, obtaining a relationship among the image coordinates and longitude and latitude values at the three points leads to acquisition of an image coordinate value corresponding to an arbitrary longitude and latitude value.

The discrimination rule storage unit 54 has a function of holding predetermined rules for use in discriminating a change (alteration) of a structure and the like by the difference data discrimination unit 53.

Here, description will be made of a hardware structure of the change discrimination device 100 according to the present embodiment.

Figure 3:
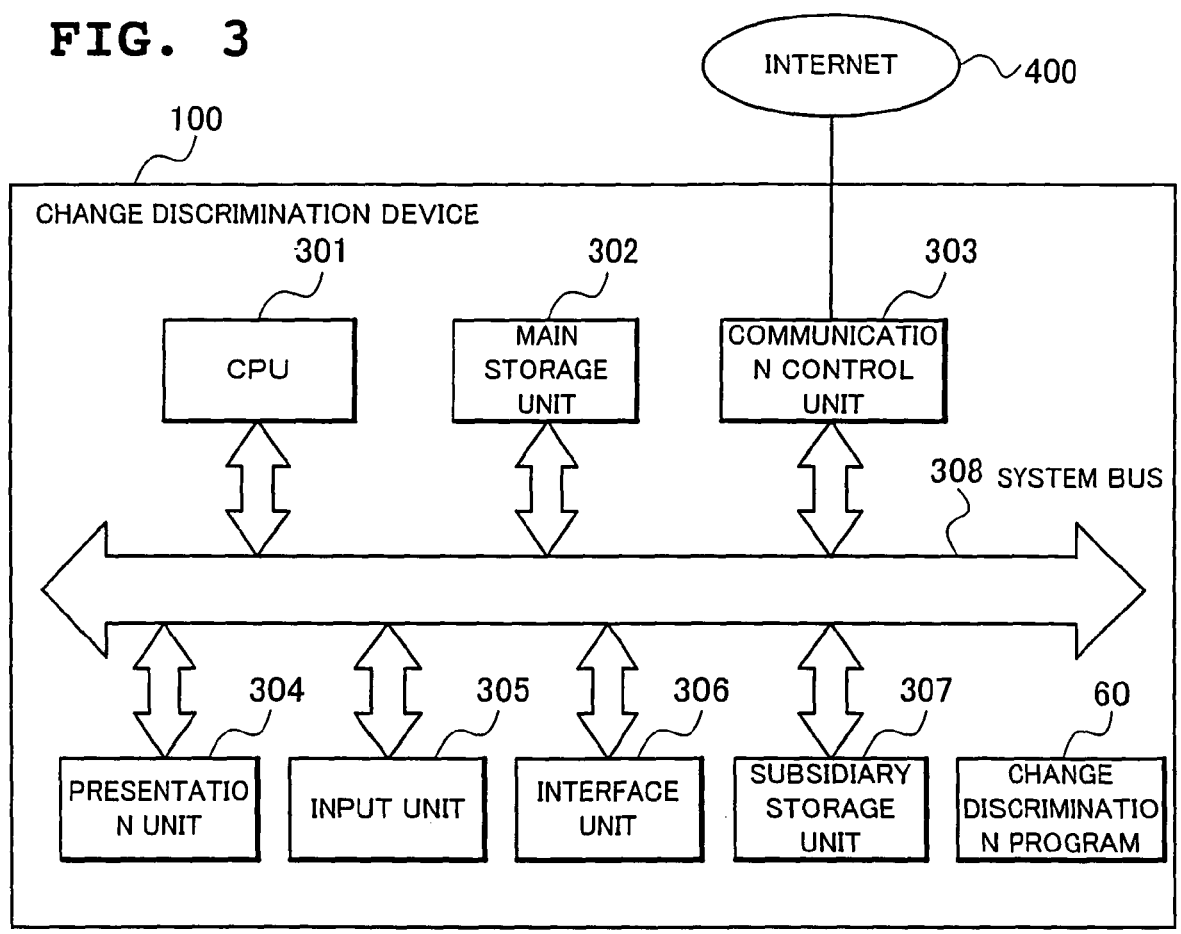
FIG. 3 is a block diagram showing a hardware structure of the change discrimination device according to the first embodiment.

FIG. 3 is a block diagram showing a hardware structure of the change discrimination device 100 according to the present embodiment.

With reference to FIG. 3, the change discrimination device 100 according to the present invention, which can be realized by the same hardware structure as that of a common computer device, includes a CPU (Central Processing Unit) 301, a main storage unit 302 which is a main memory such as a RAM (Random Access Memory) and is for use as a data working area or a data temporary saving area, a communication control unit 303 for transmitting and receiving data through an internet 400, a presentation unit 304 such as a liquid crystal display, a printer or a speaker, an input unit 305 such as a keyboard or a mouse, an interface unit 306 connected to a peripheral apparatus for transmitting and receiving data, a subsidiary storage unit 307 as a hard disk device formed of a nonvolatile memory such as a ROM (Read Only Memory), a magnetic disk or a semiconductor memory, and a system bus 308 for connecting the above-described respective components of the present information processing device with each other.

The change discrimination device 100 according to the present invention not only has its operation realized as hardware, with a circuit part internally provided in the change discrimination device 100 which part is formed of a hardware part such as an LSI (Large Scale Integration) and the like in which the change discrimination program 60 realizing such a function is incorporated but also has its operation realized as software by executing the change discrimination program 60 which provides the respective functions of the above-described components by the CPU 301 on a computer processing device.

More specifically, the CPU 301 loads the change discrimination program 60 stored in the subsidiary storage unit 307 into the main storage unit 302 and executes the same to control operation of the change discrimination device 100, thereby realizing the above-described respective functions as software.

(Operation of the First Embodiment)

Next, operation of the present embodiment will be described with reference to the flow charts shown in FIG. 4 to FIG. 8.

Figure 4:
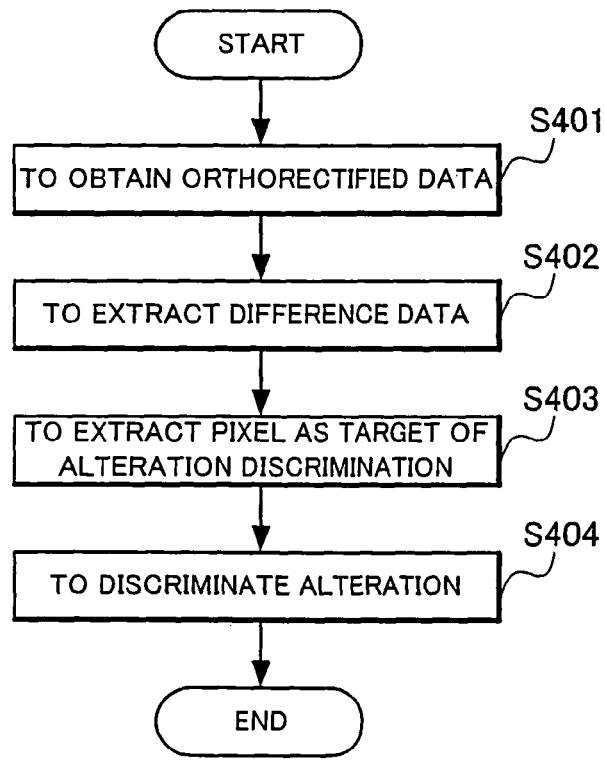
FIG. 4 is a flow chart showing outlines of processing of discriminating alteration which is executed at the change discrimination device according to the first embodiment.

FIG. 4 is a flow chart schematically showing alteration discriminating processing executed at the change discrimination device 100 according to the present invention.

More specifically, the discrimination unit 50 obtains orthorectified data from the orthorectification unit 40 (Step S401), extracts difference data from the obtained orthorectified data (Step S402) and extracts a pixel as a target of alteration discrimination based on the extracted different data (Step S403) to discriminate an alteration with respect to the extracted pixel according to predetermined rules (Step S404).

The discrimination unit 50 executes alteration discrimination according to predetermined rules held in advance in the discrimination rule storage unit 54.

For convenience' sake, a pixel here is assumed to include a minimum unit of a region used at the time of detection of color information, a longitude and a latitude, height information, a luminance value and the like which image data, ortho-image data, DSM data and ortho-DSM data have.

(Orthorectified Data Obtaining Processing)

Figure 5:
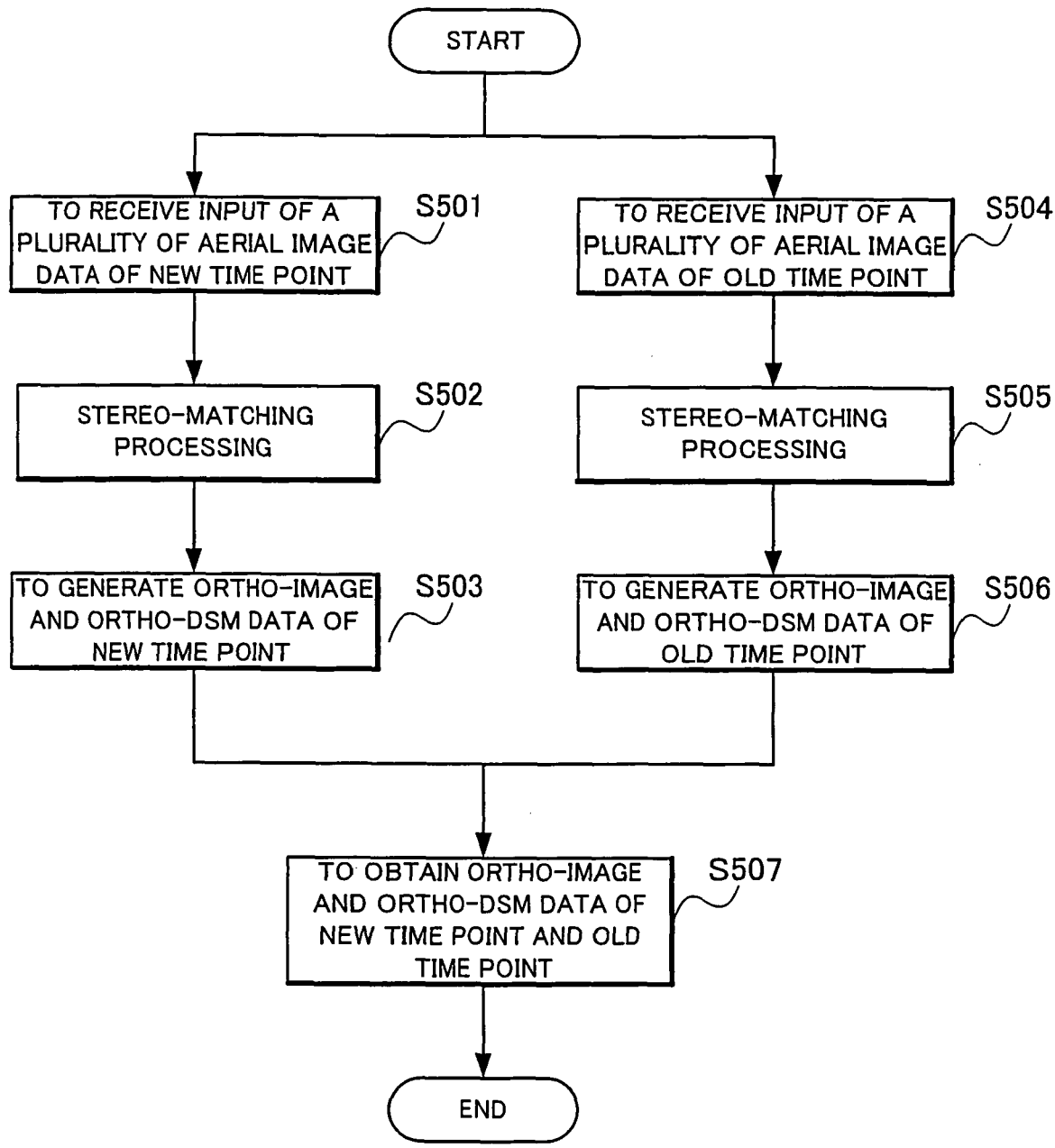
FIG. 5 is a flow chart showing one example of a processing progress of the change discrimination device according to the first embodiment.

FIG. 5 is a flow chart showing one example of orthorectified data obtaining processing shown in Step S401 in FIG. 4.

First, the new time point image data input unit 10 receives input of a plurality of aerial image data of a new time point (Step S501).

At this time, the plurality of aerial image data to be applied is aerial image data obtained by photographing at different photographing spots at the new time point.

Input may be, for example, image data of the aerial photograph 101A and image data of the aerial photograph 101B shown in FIG. 32 and FIG. 33 at the new time point.

Next, the stereo processing unit 30 receives input of the plurality of aerial images of the new time point from the new time point image data input unit 10 and executes stereo-matching processing to extract DSM data of the new time point (Step S502).

Next, the orthorectification unit 40 receives input of aerial image data of the new time point from the new time point image data input unit 10 and also receives input of DSM data of the new time point from the stereo processing unit 30 to execute orthogonal projective transformation of the aerial image data of the new time point by using the DSM data of the new time point, thereby generating the ortho-image data of the new time point. Furthermore, the orthorectification unit 40 executes orthogonal projective transformation of the DSM data of the new time point by using the DSM data of new time point to generate ortho-DSM data of the new time point similarly to the aerial image data of the new time point (Step S503).

On the other hand, as to the plurality of aerial image data of the old time point, the same processing as that of the aerial image of the new time point is executed.

More specifically, the old time point image data input unit 20 receives input of a plurality of aerial images of the old time point (Step S504), the stereo processing unit 30 receives input of the plurality of aerial images of the old time point from the old time point image data input unit 20 and executes stereo-matching processing to extract DSM data of the old time point (Step S505), and the orthorectification unit 40 receives input of the aerial image of the old time point from the old time point image data input unit 20 and receives input of the DSM data of the old time point from the stereo processing unit 30 to execute orthogonal projective transformation of the aerial image of the old time point and the DSM data of the old time point by using the DSM data of the old time point, thereby generating an ortho-image of the old time point and ortho-DSM data of the old time point (Step S506).

The plurality of aerial image data of the old time point applied at this time is aerial image data of the same region photographed as that of the plurality of aerial image data of the new time point.

Although executed here after the stereo-matching processing and the orthorectification of the aerial image data of the new time point are the stereo-matching processing and the orthorectification of the aerial image data of the old time point as an example, the order of execution of these processing is not limited, and the stereo-matching processing and the orthorectification of the aerial image data of the new time point may be executed after the stereo-matching processing and the orthorectification of the aerial image data of the old time point.

It is further possible to execute the stereo-matching processing of the aerial image data of the old time point after the stereo-matching processing of the aerial image data of the new time point and before execution of the orthorectification of the aerial image data of the new time point or to execute the stereo-matching processing of the aerial image data of the new time point after the stereo-matching processing of the aerial image data of the old time point and before execution of the orthorectification of the aerial image data of the old time point. Alternatively, the stereo-matching processing and the orthorectification may be executed in parallel.

Next, the discrimination unit 50 obtains the ortho-image data and the ortho-DSM data of the new time point and the ortho-image data and the ortho-DSM data of the old time point from the orthorectification unit 40 (Step S507) to result in executing orthorectified data acquisition processing.
(Difference Data Extraction Processing)

Figure 6:
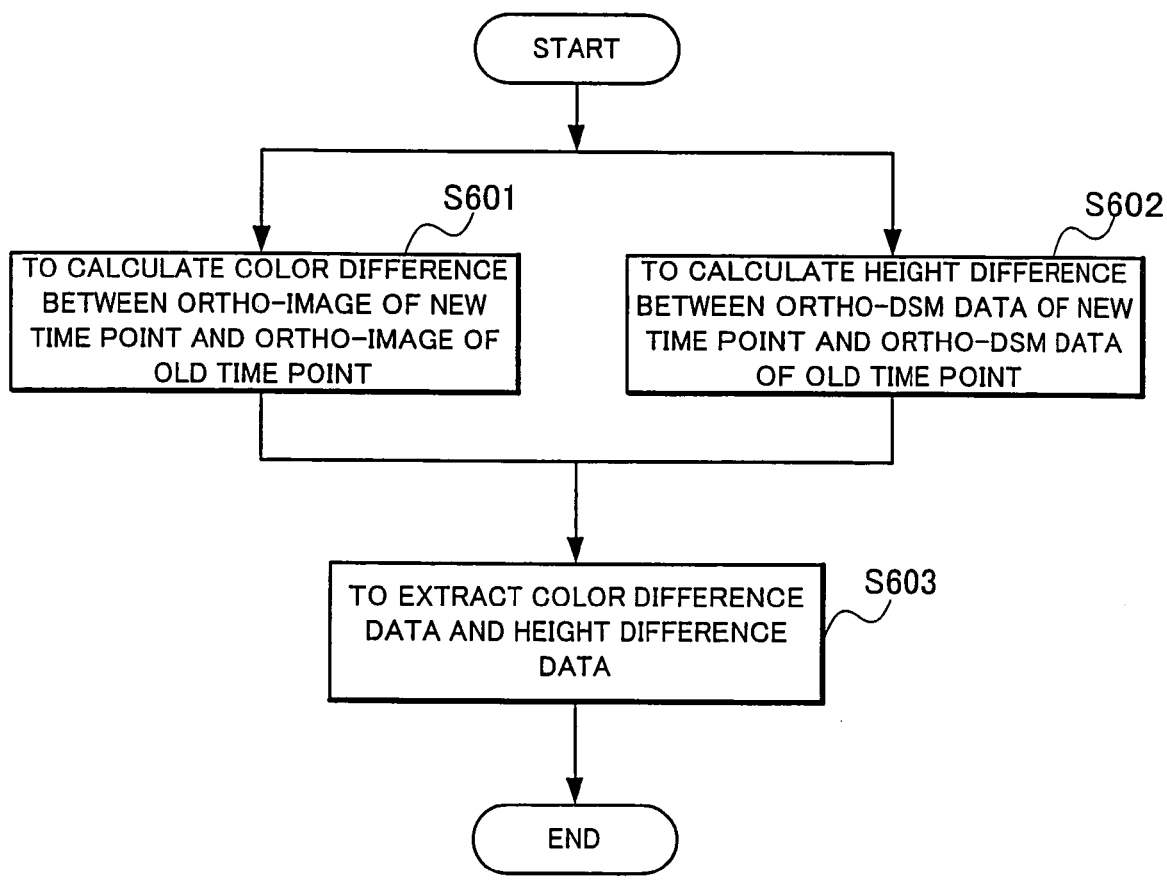
FIG. 6 is a flow chart showing one example of the progress of processing of discriminating alteration executed at the discrimination unit according to the first embodiment.

FIG. 6 is a flow chart showing one example of difference data extraction processing illustrated in Step S402 in FIG. 4.

First, the color difference calculation unit 51 receives input of ortho-image data of a new time point and ortho-image data of an old time point from the orthorectification unit 40 and calculates a color difference to output color difference data (Step S601).

On the other hand, the height difference calculation unit 52 receives input of ortho-DSM data of the new time point and ortho-DSM data of the old time point from the orthorectification unit 40 and calculates a height difference to output height difference data (Step S602).

Here, the order of execution of the color difference calculation (Step S601) and the height difference calculation (Step S602) has no limitation and color difference calculation may be executed after height difference calculation or they may be executed in parallel.

Thus, the difference data discrimination unit 53 extracts color difference data from the color difference calculation unit 51, as well as extracting height difference data from the height difference calculation unit 52 (Step S603) to result in execution of the difference data extraction processing at the discrimination unit 50.

Figure 7:
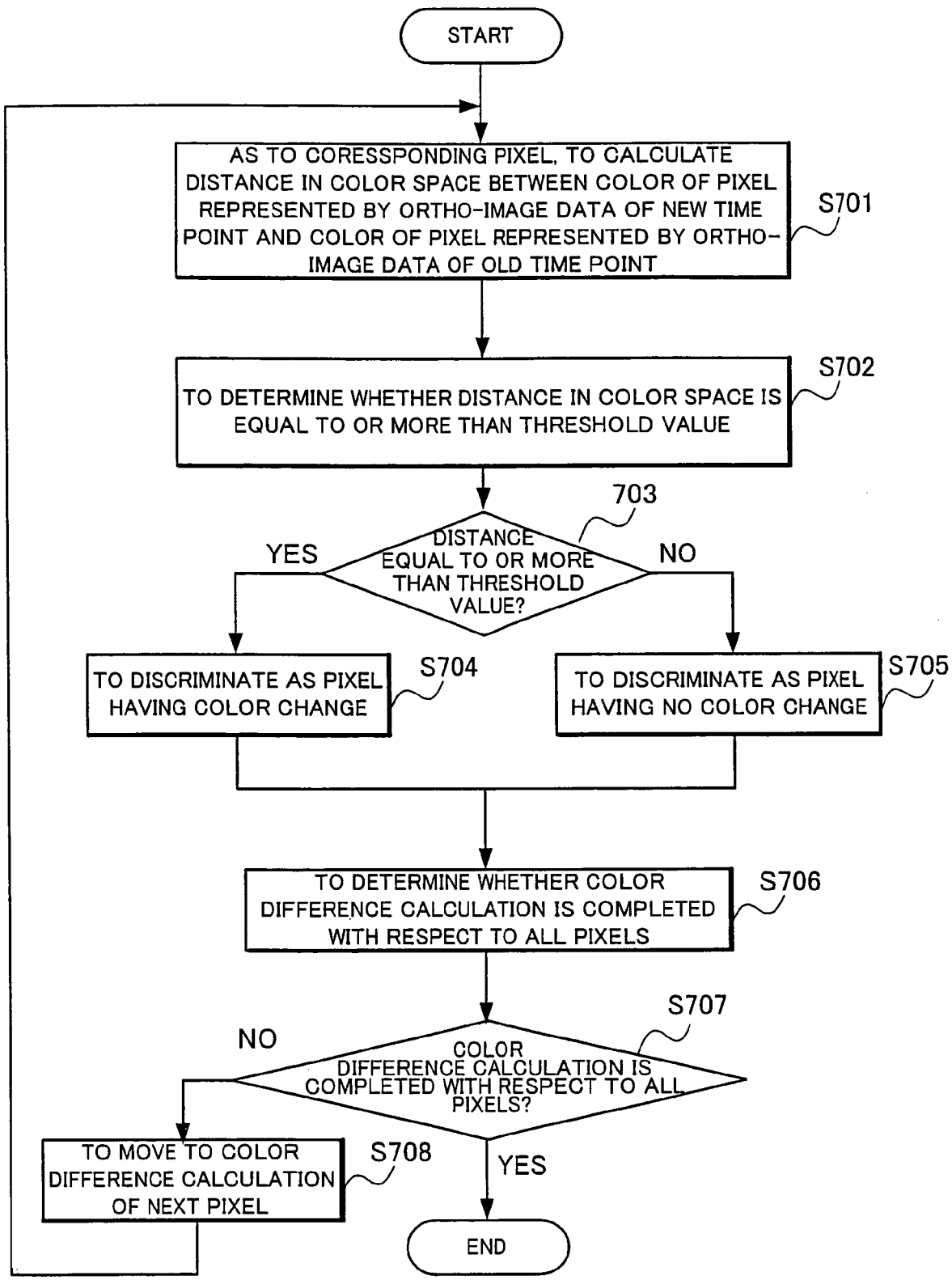
FIG. 7 is a flow chart showing one example of a processing progress of a color difference calculation unit according to the first embodiment.

Here, with reference to the flow chart shown in FIG. 7, a method of the color difference calculation shown in Step S601 in FIG. 6 will be specifically described.

Processing of color difference calculation has a case where color image data is a target of calculation and a case where monochrome image data is a target of calculation, and description will be first made of the case where color image data is a target of calculation.

First, the color difference calculation unit 51 obtains, as to each corresponding pixel, a distance in a color space between a color of the pixel represented by the ortho-image data of the new time point and a color of the pixel represented by the ortho-image data of the old time point (Step S701) to determine whether the distance in the color space is equal to or more than a threshold value set in advance (Step S702) and when it is equal to or more than the threshold value (Step S703), determines that the pixel is a pixel having a color change (Step S704) and when it is less than the threshold value (Step S703), determines that the pixel is a pixel having no color change (Step S705).

Next, the color difference calculation unit 51 determines whether color difference calculation is completed with respect to all the pixels or not (Step S706) and when the color difference calculation is yet to be completed with respect to all the pixels (Step S707), moves on to color difference calculation with respect to a subsequent pixel (Step S708) and when the color difference calculation is completed with respect to all the pixels (Step S707), finishes the processing to extract color difference data as a result of the calculation.

Form of the color difference data is an image indicative of a determination result corresponding to each pixel.

In this case, set a pixel value of a pixel determined to have a color change to be 1 and a pixel value of a pixel determined to have no color change to be 0.

In addition, together with image data, a value of a distance in a color space of each pixel may be contained in the color difference data, or values of colors of a new time point and an old time point with respect to each pixel may be contained in the color difference data or mean values of colors of a new time point and an old time point with respect to each pixel may be contained in the color difference data.

While the foregoing is the description of a case where color image data is a target of calculation, in a case where monochrome image data is a target of calculation, the color difference calculation processing can be executed in completely the same manner by replacing a distance in a color space by a monochrome tone difference.

Figure 8:
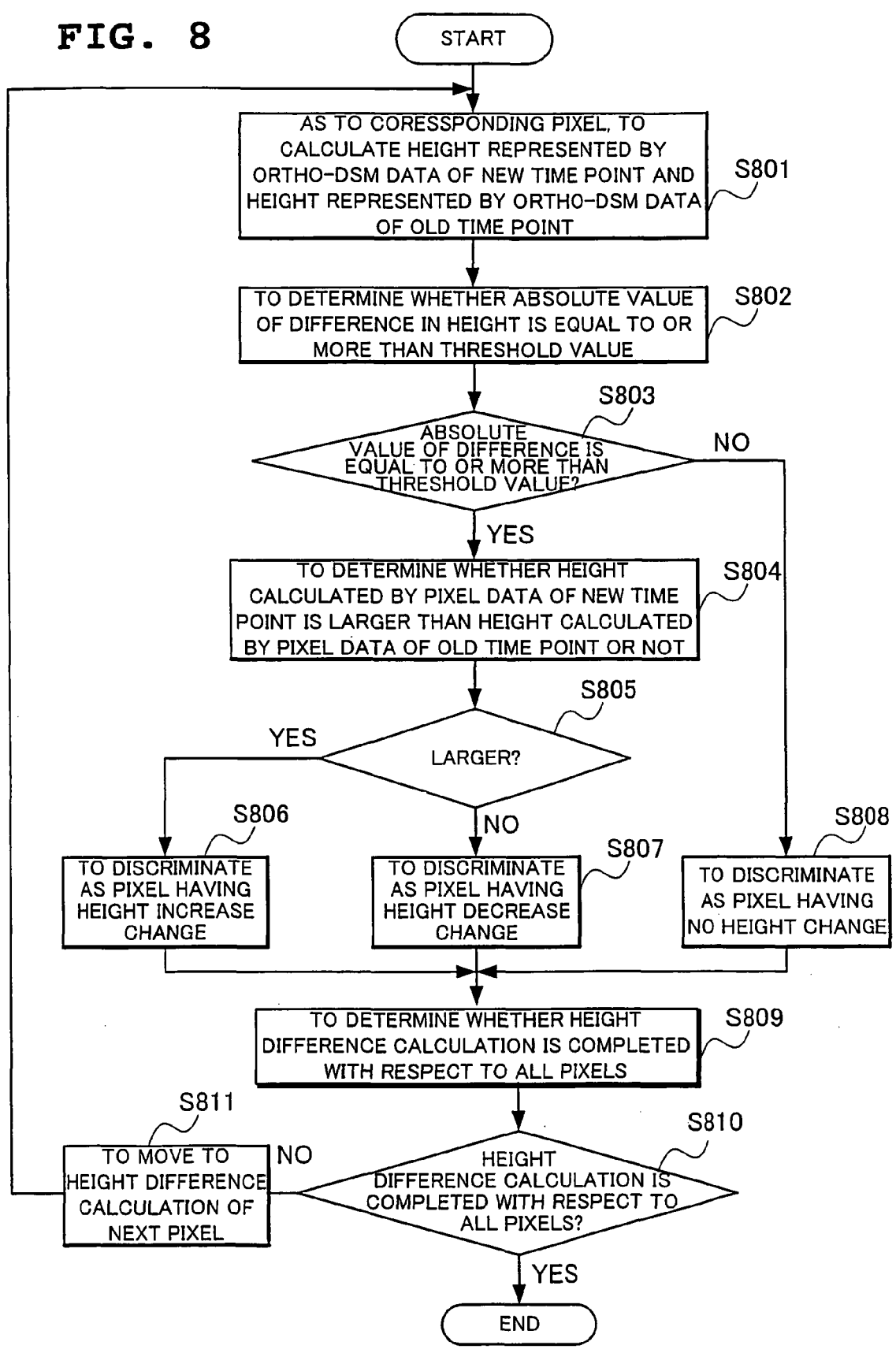
FIG. 8 is a flow chart showing one example of a processing progress of a height difference calculation unit according to the first embodiment.

With reference to the flow chart shown in FIG. 8, a method of calculating a height difference shown in Step S602 in FIG. 6 will be described in detail.

First, the height difference calculation unit 52 obtains a difference between a height of ortho-DSM data of a new time point and a height of ortho-DSM data of an old time point with respect to each corresponding pixel (Step S801) to determine whether an absolute value of the difference is equal to or more than a threshold value given in advance (Step S802).

Next, in a case where the value is equal to or more than the threshold value (Step S803), the height difference calculation unit 52 determines whether the height of the new time point is higher than the height of the old time point (Step S804) and when the height of the new time point is higher than the height of the old time point (Step S805), determines that the pixel is a pixel having a change of an increase in height (Step S806) and when the height of the new time point is lower than the height of the old time point (Step S805), determines that the pixel is a pixel having a change of a decrease in height (Step S807).

On the other hand, when the determination result at Step S803 finds that the absolute value of the difference is less than the threshold value given in advance, determination is made that the pixel is a pixel having no height change (Step S808).

Subsequently, the height difference calculation unit 52 determines whether the height difference calculation is completed for all the pixels (Step S809) and when the height difference calculation is yet to be completed for all the pixels (Step S810), moves to the height difference calculation of a subsequent pixel (Step S811) and when the height difference calculation is completed for all the pixels (Step S810), extracts height difference data as a determination result.

Here, a form of the height difference data is an image indicative of a determination result corresponding to each pixel.

In this case, set a pixel value of a pixel determined to have a change of a height increase to be 1, a pixel value of a pixel determined to have a change of a height decrease to be 2 and a pixel value of a pixel determined to have no change to be 0. In addition, together with an image, a difference value of each pixel may be contained in the height difference data.

(Correction Processing)
(Color Correction Processing)

In addition, at the time of calculation of a color difference by the color difference calculation unit 51, a whole color difference between the ortho-image data of the new time point and the ortho-image data of the old time point may be calculated to execute color correction processing of image data.

Since image data color correction processing enables correction of a whole color difference between the ortho-image data of the new time point and the old time point caused by a difference in lighting conditions at photographing or an aerial photograph scanning method, erroneous discrimination of a whole color difference as an alternation can be prevented at the discrimination unit 50 to increase alteration discrimination precision.

Figure 9:
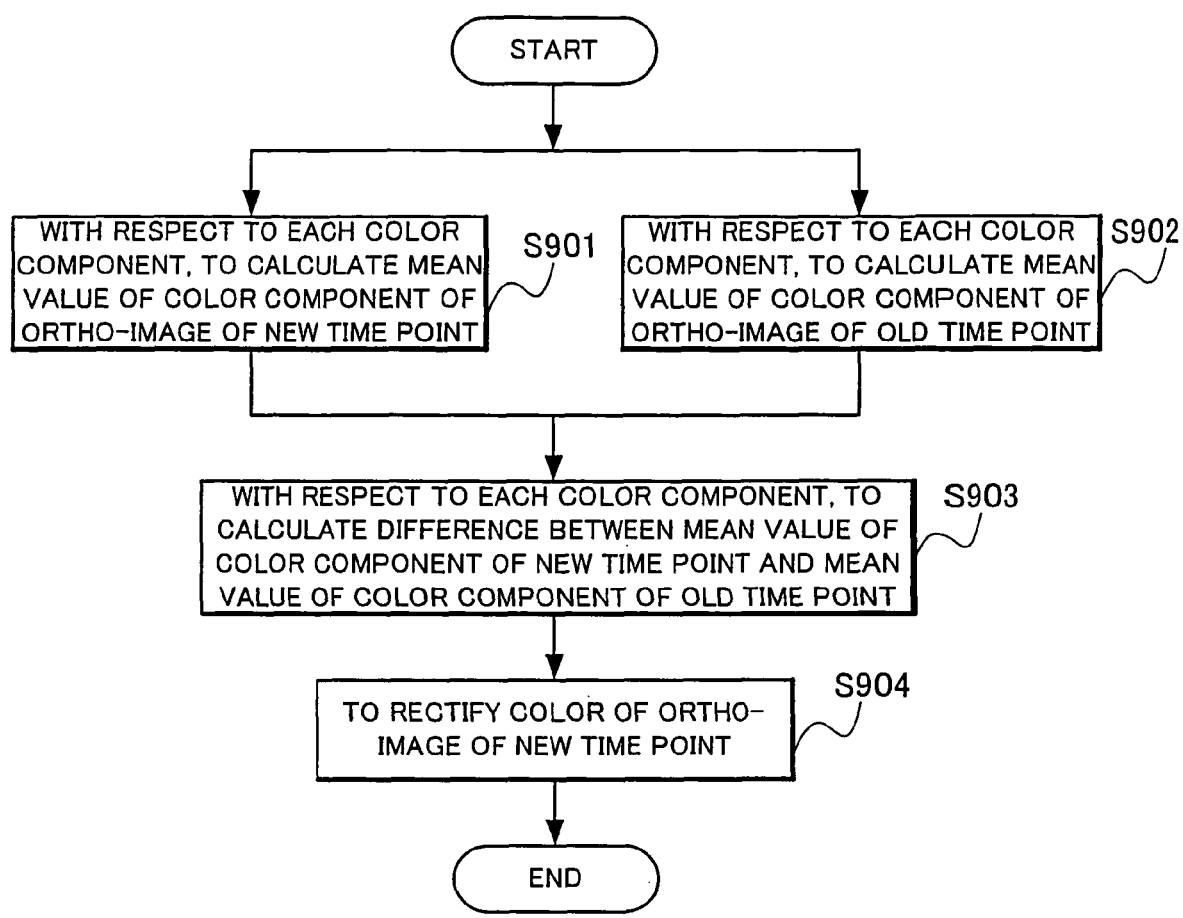
FIG. 9 is a flow chart showing one example of the progress of processing of correcting color of an image at a difference data discrimination unit according to the first embodiment.

With reference to the flow chart of FIG. 9, color correction processing will be described in detail.

First, with respect to each color component, the color difference calculation unit 51 obtains a mean value of a color component of ortho-image data of a new time point (Step S901), as well as obtaining a mean value of a color component of ortho-image data of an old time point (Step S902).

Color component here represents each color in an RGB color space, from which a mean value of R, a mean value of G and a mean value of B are obtained respectively.

In place of the RGB color space, for example, a Luv color specification system may be used, a Lab color specification system may be used, an XYZ color specification system may be used, a YCC color base may be used or a YUV color base may be used, with no limitation imposed on a color component to be used.

Subsequently, with respect to each color component, the color difference calculation unit 51 calculates a difference between the mean value of the color component obtained from the ortho-image data of the new time point and the mean value of the color component obtained from the ortho-image data of the old time point (Step S903).

Next, with respect to all the pixels of the ortho-image data of the new time point, the color difference calculation unit 51 rectifies the color of the ortho-image data of the new time point by subtracting the calculated difference value of each color component from each color component (Step S904).

While as one example here, the color of the ortho-image data of the new time point is subjected to rectification processing, the color of the ortho-image data of the old time point may be subjected to rectification processing.

In addition, while as an example here, a mean value of each color component is obtained by using the ortho-image data, the color difference calculation unit 51 may receive input of the aerial image data of the new time point from the new time point image data input unit 10, as well as receiving input of aerial image data of the old time point from the old time point image data input unit 20 to obtain a mean value of each color component of the aerial image data by using the applied aerial image data.

(Height Correction Processing)

In addition, at the time of calculation of a height difference by the height difference calculation unit 52, a whole height difference between the ortho-DSM data of the new time point and the ortho-DSM data of the old time point may be calculated to execute height correction processing of the ortho-DSM data.

This enables fine adjustment of a height on the order of not more than an effective number of figures.

Figure 10:
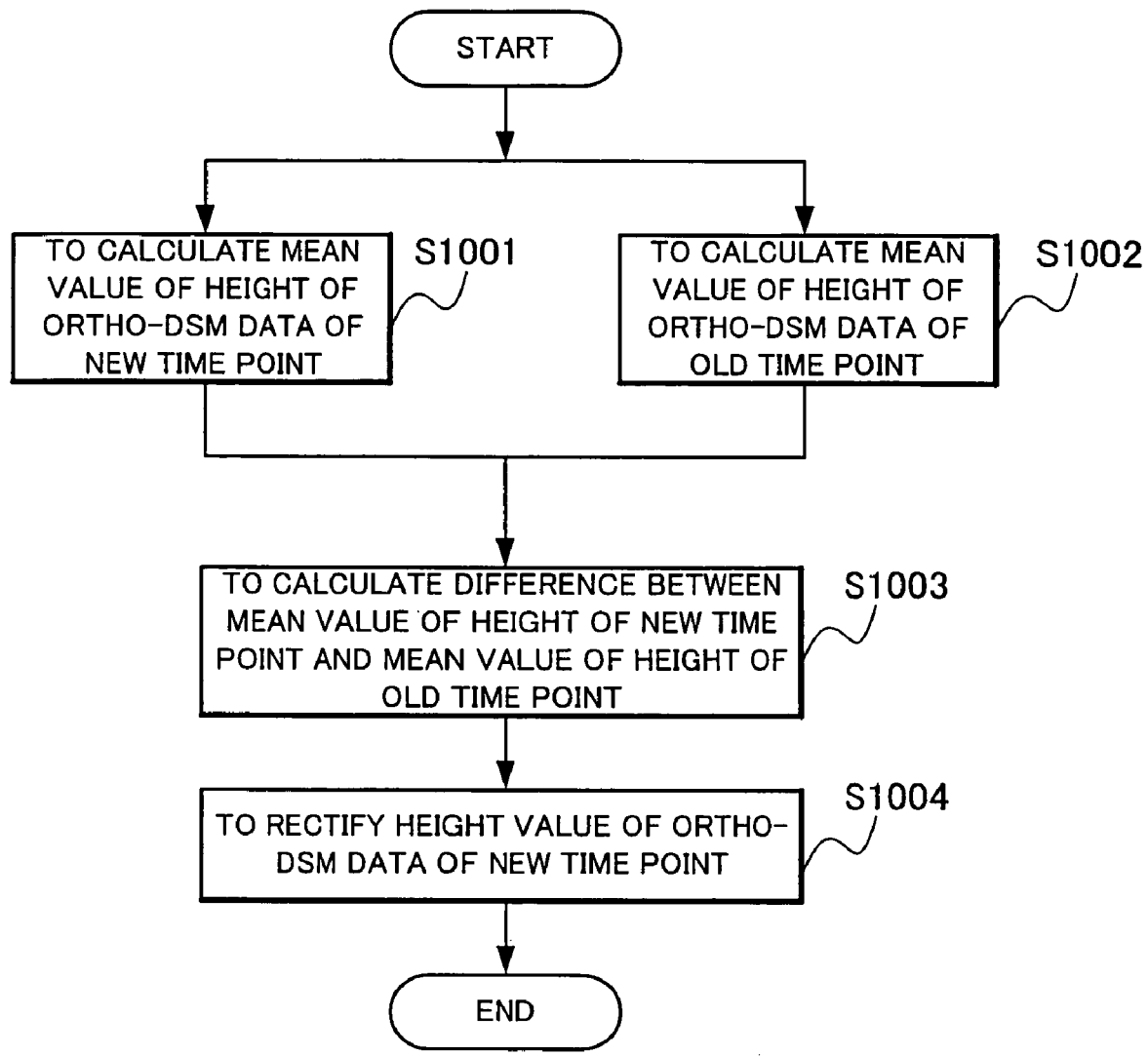
FIG. 10 is a flow chart showing one example of the progress of processing of correcting a height of DSM data at the difference data discrimination unit according to the first embodiment.

With reference to the flow chart of FIG. 10, height correction processing will be described in detail.

First, the height difference calculation unit 52 obtains a means value of a height of the ortho-DSM data of the new time point (Step S1001), as well as obtaining a mean value of a height of the ortho-DSM data of the old time point (Step S1002).

Subsequently, the height difference calculation unit 52 calculates a difference between a mean value of a height of a new time point and a mean value of a height of an old time point (Step S1003).

Subsequently, with respect to all the pixels of the ortho-DSM data of the new time point, the height difference calculation unit 52 rectifies a height of the ortho-DSM data of the new time point by subtracting the calculated height difference value (Step S1004).

While as an example here, a height of the ortho-DSM data of the new time point is rectified, a height of the ortho-DSM data of the old time point may be rectified.

In addition, while as an example here, a mean value of a height is obtained by using the ortho-DSM data, the height difference calculation unit 52 may receive input of the DSM data of the new time point and the DSM data of the old time point from the stereo processing unit 30 to obtain a mean value of a height of DSM data by using the DSM data.

(Effects of the First Embodiment)

According to the above-described first embodiment, the following effects can be attained.

First, alteration of a feature on the earth can be discriminated by a change in height of the feature on the earth.

The reason is that executing stereo-matching processing and orthorectification with respect to image data of a feature on the earth to make determination based on predetermined rules enables information about a height change of the feature on the earth and a region where a height of the feature on the earth changes to be correlated with each other to high precision at a new time point and an old time point.

Secondly, alteration of a feature on the earth can be discriminated irrespectively of a difference in lighting conditions at image photographing or a difference in photographing conditions.

The reason is that alteration of a feature on the earth is discriminated by a change in height of the feature on the earth as mentioned in the above-described first effect.

Thirdly, alteration of a feature on the earth can be discriminated on a pixel basis, that is, at minute distance intervals.

The reason is that a height change is discriminated on an image pixel basis by using stereo-matching processing.

Fourthly, alteration of a feature on the earth can be discriminated by a change in color of a feature on the earth.

The reason is that executing orthorectification with respect to image data of a feature on the earth to make determination based on predetermined rules enables information about a color change of the feature on the earth and a region where the color of the feature on the earth changes to be correlated with each other to high precision.

Fifthly, alteration of a feature on the earth whose height has no big change can be discriminated.

The reason is that alteration of a feature on the earth is discriminated by a change in color of the feature on the earth as mentioned in the above-described fourth effect.

Sixthly, alteration of a feature on the earth can be discriminated to high precision.

The reason is that processing of discriminating an alteration is executed in combination between a color change and a height change of a feature on the earth.

Seventhly, alteration of a feature on the earth can be discriminated at low costs.

The reason is that a color change and a height change of a feature on the earth can be calculated based only on image data of an aerial photograph.

MODIFICATION EXAMPLE 1

The modification example 1 is one example of application of the present invention to the change discrimination device shown above as the first embodiment.

Since the modification example 1 adopts the same basic structure and basic operation as those of the first embodiment, description will be made mainly of a difference from the first embodiment in the following, and description of a structure and operation common to the first embodiment will be appropriately omitted.

Also as to the respective embodiments and modification examples which will be described later, since they adopt the same basic structure and basic operation as those of the first embodiment similarly to the modification example 1, description will be made mainly of a difference from the first embodiment, and description of a structure and operation common to the first embodiment will be appropriately omitted.

(Contents of Alteration Discriminating Processing in Modification Example 1)

With reference to the flow charts in FIG. 11 to FIG. 14, pixel extraction processing in the modification example 1 which is applied to Step S403 in FIG. 4 and alteration discriminating processing in the modification example 1 which is applied to Step S404 will be described in detail.

As alterations to be discriminated in the modification example 1, four kinds, "new construction", "destruction", "unknown" and "reform" will be described.

Here, "new construction" represents a state where a new structure is added to a lot with no buildings on it.

Here, "destruction" represents a state where a structure is lost to have a lot with no buildings on it.

Here, "unknown" represents a state of being hidden behind a structure.

Here, "reform" represents, in a case of discrimination of an alteration of a house, for example, expansion or reform, repainting of a rooftop or new construction after destruction.

(New Construction Discriminating Processing)

Figure 11:
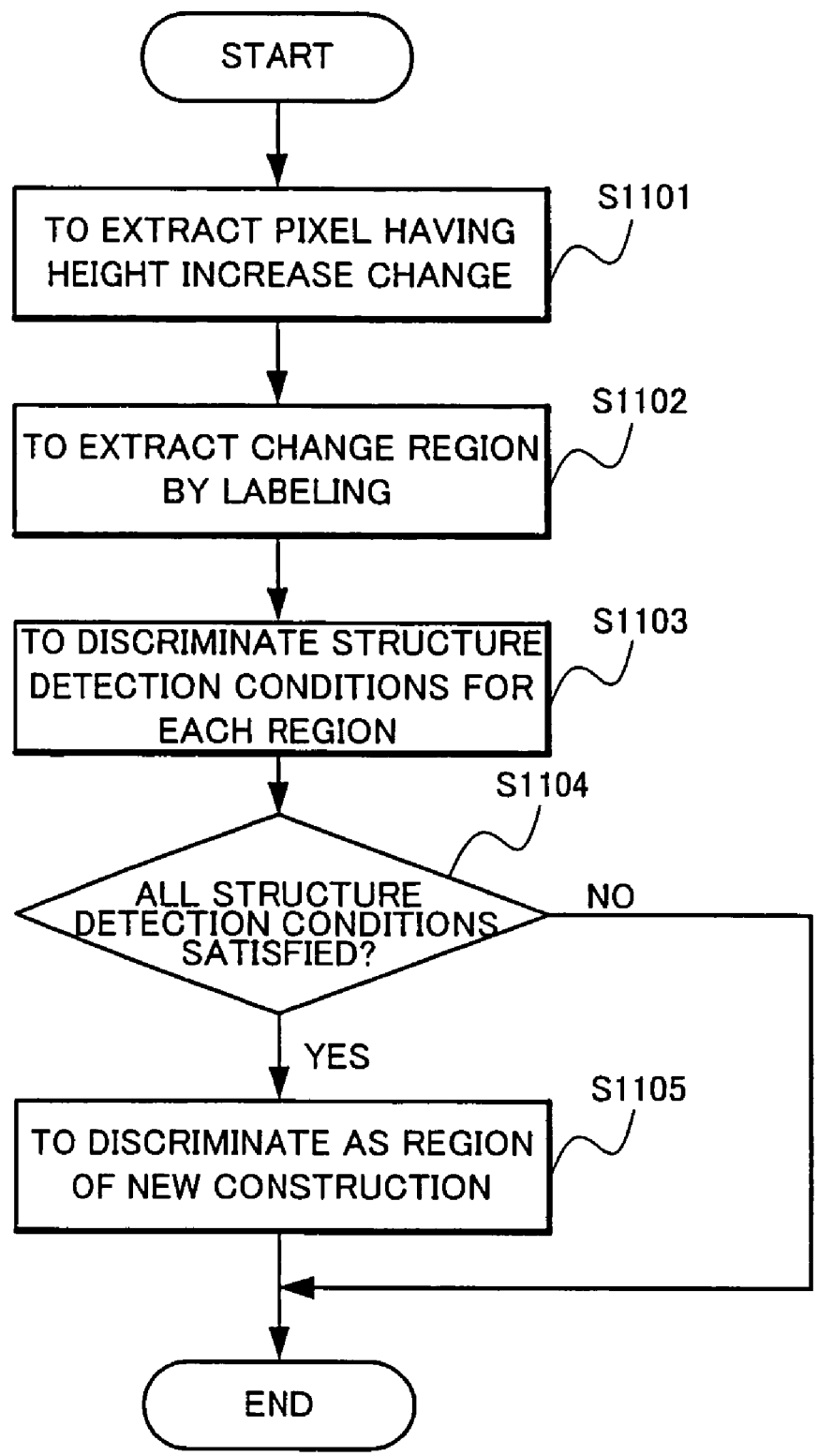
FIG. 11 is a flow chart showing one example of the progress of processing of discriminating new construction at the difference data discrimination unit in a variation example 1.

First, with reference to the flow chart shown in FIG. 11, new construction discriminating processing will be detailed.

In new construction discriminating processing, a region where a change of an increase in height occurs is determined to be a region where new construction of a structure occurs in a predetermined case.

Here, Step S1101 in FIG. 11 corresponds to Step S403 in FIG. 4 and Step S1102 to Step S1105 in FIG. 11 correspond to Step S404 in FIG. 4.

First, extract a pixel determined to have a change of a height increase in the height difference data (Step S1101).

Next, as to the extracted pixel, execute labeling processing (Step S1102).

Labeling processing here is processing of applying, when two adjacent pixels are the above-described extracted pixels, the same label to both the pixels, which is processing of extracting extracted pixels adjacent to each other as one region.

After executing the labeling processing at Step S1102 to make pixels having the same label be one label region, discriminate structure detection conditions of each label region (Step S1103).

Here, the structure detection conditions are conditions for determining whether a target is a structure or not and are, for example, conditions under which a small region not large enough for one structure is not regard as a structure in order to prevent erroneous detection due to effects of noise of aerial image data.

More specifically, structure detection conditions are set as follows:

1. The number of pixels (or an actual distance) in a longitudinal direction and the number of pixels (or an actual distance) in a lateral direction in a region is not less than a predetermined threshold value and less than a predetermined threshold value.

2. Area of the region (the number of pixels or an actual area) is not less than a predetermined threshold value and less than a predetermined threshold value.

The structure detection conditions shown here are one of examples and the condition is not limited thereto.

Lastly, discriminate a label region satisfying all the structure detection conditions (Step S1104) as a region of new construction (Step S1105).

When there exists no label region that satisfies all the structure detection conditions (Step S1104), end the processing.

(Destruction Discriminating Processing)

Figure 12:
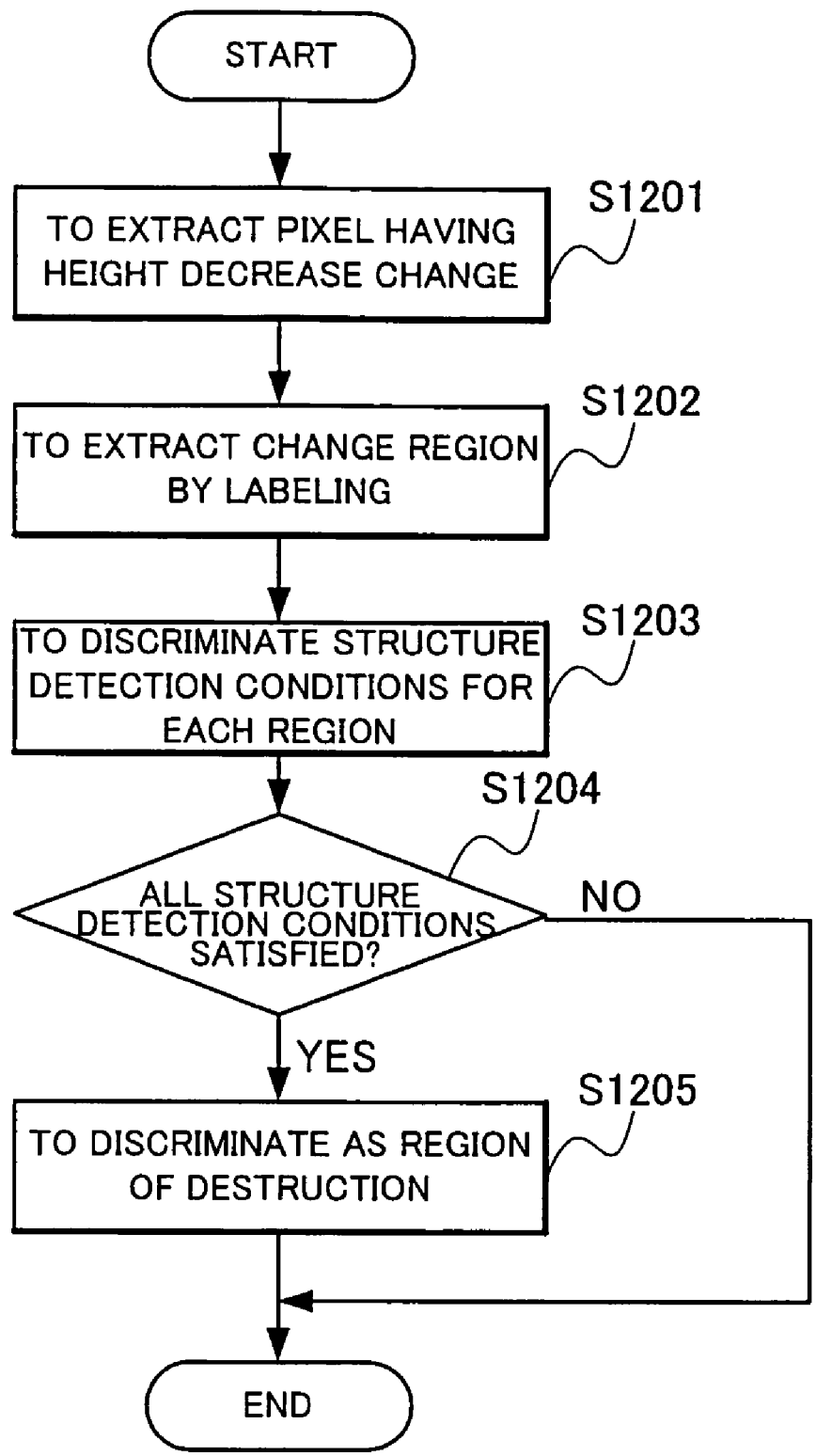
FIG. 12 is a flow chart showing one example of the progress of processing of discriminating destruction at the difference data discrimination unit in the variation example 1.

Next, with reference to the flow chart shown in FIG. 12, destruction discriminating processing will be detailed.

In destruction discriminating processing, a region where a change of a decrease in height occurs is determined to be a region where destruction of a structure occurs in a predetermined case.

Here, Step S1201 in FIG. 12 corresponds to Step S403 in FIG. 4 and Step S1202 to Step S1205 in FIG. 12 correspond to Step S404 in FIG. 4.

First, from height difference data, extract a pixel determined to have a change of a decrease in height in the height difference data (Step S1201).

Hereafter, execute the same processing as the above-described new construction discriminating processing to determine, when the structure detection conditions are satisfied, that the extracted region is a region of destruction (Step S1202 to Step S1205).

(Alteration Unknown Discriminating Processing)

On the other hand, a region from which no height can be obtained because of being hidden behind a structure may be determined to be a region in which alteration is unknown.

A region from which no height is obtained can be detected in the course of the stereo-matching processing.

More specifically, when at the stereo-matching processing, in corresponding image data, a certain region in one image data fails to exist in other image data, detection is made by determining that no height can be obtained from the region.

With reference to the flow chart of FIG. 13, unknown discriminating processing will be described in detail.

In alteration unknown discriminating processing, a region from which no height is obtained is determined to be a region where an alteration of a structure is unknown in a predetermined case.

Figure 13:
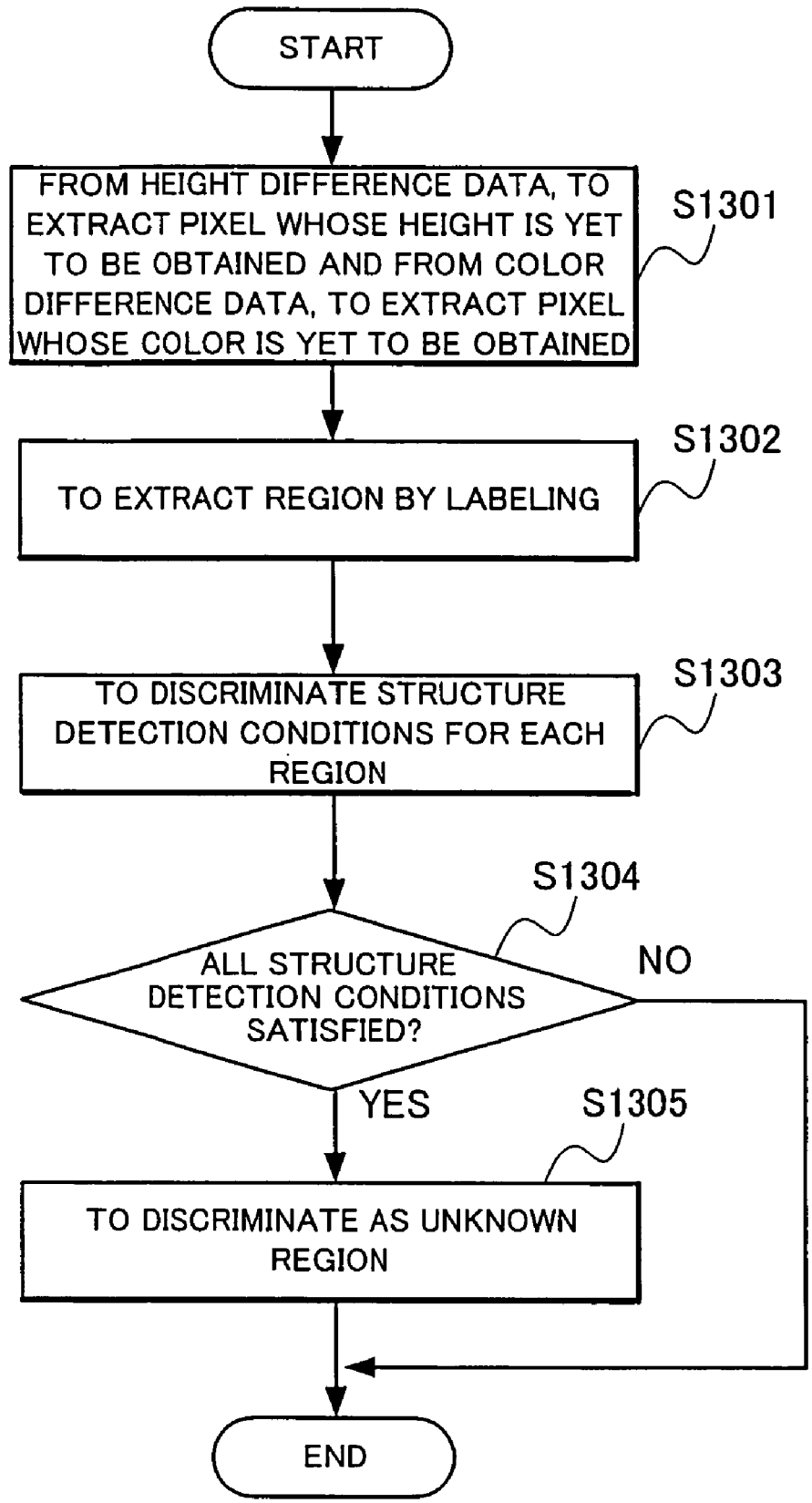
FIG. 13 is a flow chart showing one example of the progress of processing of discriminating unknown at the difference data discrimination unit in the variation example 1.

Here, Step S1301 in FIG. 13 corresponds to Step S403 in FIG. 4 and Step S1302 to Step S1305 in FIG. 13 correspond to Step S404 in FIG. 4.

First, from height difference data, extract a pixel from which no height is obtained in the height difference data (Step S1301).

Hereafter, execute the same processing as the above-described new construction discriminating processing to determine, when the structure detection conditions are satisfied, that the extracted region is a region in which an alteration of a structure is unknown (Step S1302 to Step S1305).

(Reform Discriminating Processing)

Figure 14:
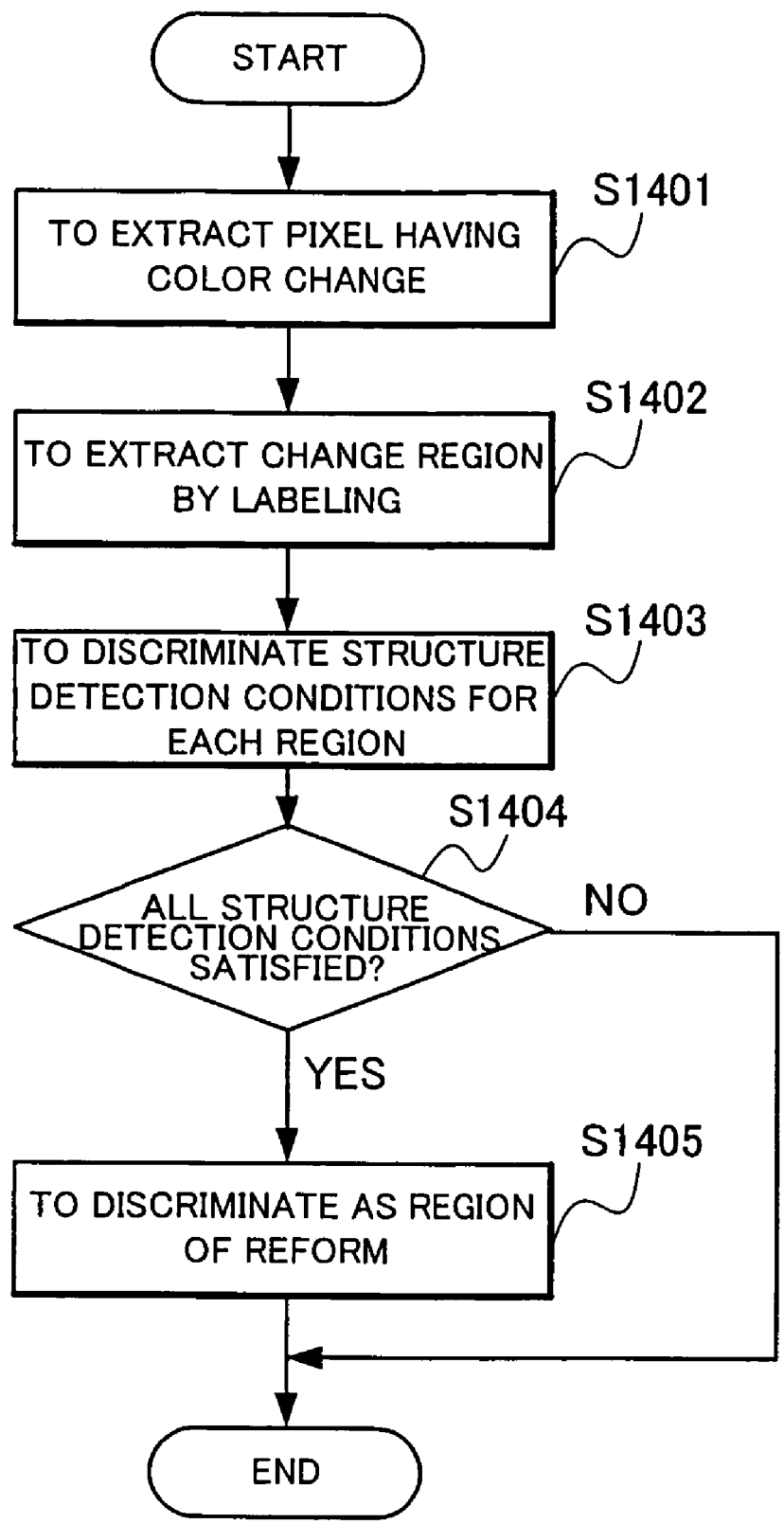
FIG. 14 is a flow chart showing one example of the progress of processing of discriminating reform at the difference data discrimination unit in the variation example 1.

Next, with reference to the flow chart shown in FIG. 14, reform discriminating processing will be detailed.

In reform discriminating processing, a region where a color change occurs is determined to be a region where reform of a structure occurs in a predetermined case.

Here, Step S1401 in FIG. 14 corresponds to Step S403 in FIG. 4 and Step S1402 to Step S1405 in FIG. 14 correspond to Step S404 in FIG. 4.

First, from color difference data, extract a pixel determined to have a color change in the color difference data (Step S1401).

Hereafter, execute the same processing as the above-described new construction discriminating processing to determine, when the structure detection conditions are satisfied, that the extracted region is a region of reform (Step S1402 to Step S1405).

(Effects of Modification Example 1)

According to the modification example 1 described in the foregoing, new construction and destruction of a structure can be discriminated by a change in height of the structure.

The reason is that by executing stereo-matching processing and orthorectification with respect to image data of a structure to discriminate structure detection conditions, information about a height change of the structure and a region in which a height changes can be correlated with each other to high precision at a new time point and an old time point.

In addition, according to the modification example 1, a region where a structure might be hidden judging from the height of the structure can be presented.

The reason is that because in a region hidden behind a structure, other structure might be hidden behind the structure, a region from which no height can be obtained because it is hidden behind the structure and can not be seen can be detected by determining that the region is a region in which alteration is unknown.

Furthermore, according to the modification example 1, reform of a structure can be discriminated from a color change of the structure.

The reason is that by executing orthorectification with respect to image data of a structure to discriminate structure detection conditions, information about a color change of the structure and a region in which a color changes can be correlated with each other to high precision at a new time point and an old time point.

MODIFICATION EXAMPLE 2

The modification example 2 is to execute alteration discriminating processing by combining a color difference and a height difference.

(Contents of Alteration Discriminating Processing in Modification Example 2)

With reference to the flow charts in FIG. 15 to FIG. 18, detailed description will be made of pixel extraction processing in the modification example 2 which is applied to Step S403 in FIG. 4 and alteration discriminating processing in the modification example 2 which is applied to Step S404.

As alterations to be discriminated in the modification example 2, two kinds will be described with respect to "new construction" and "destruction", respectively.

(New Construction Discriminating Processing)

Figure 15:
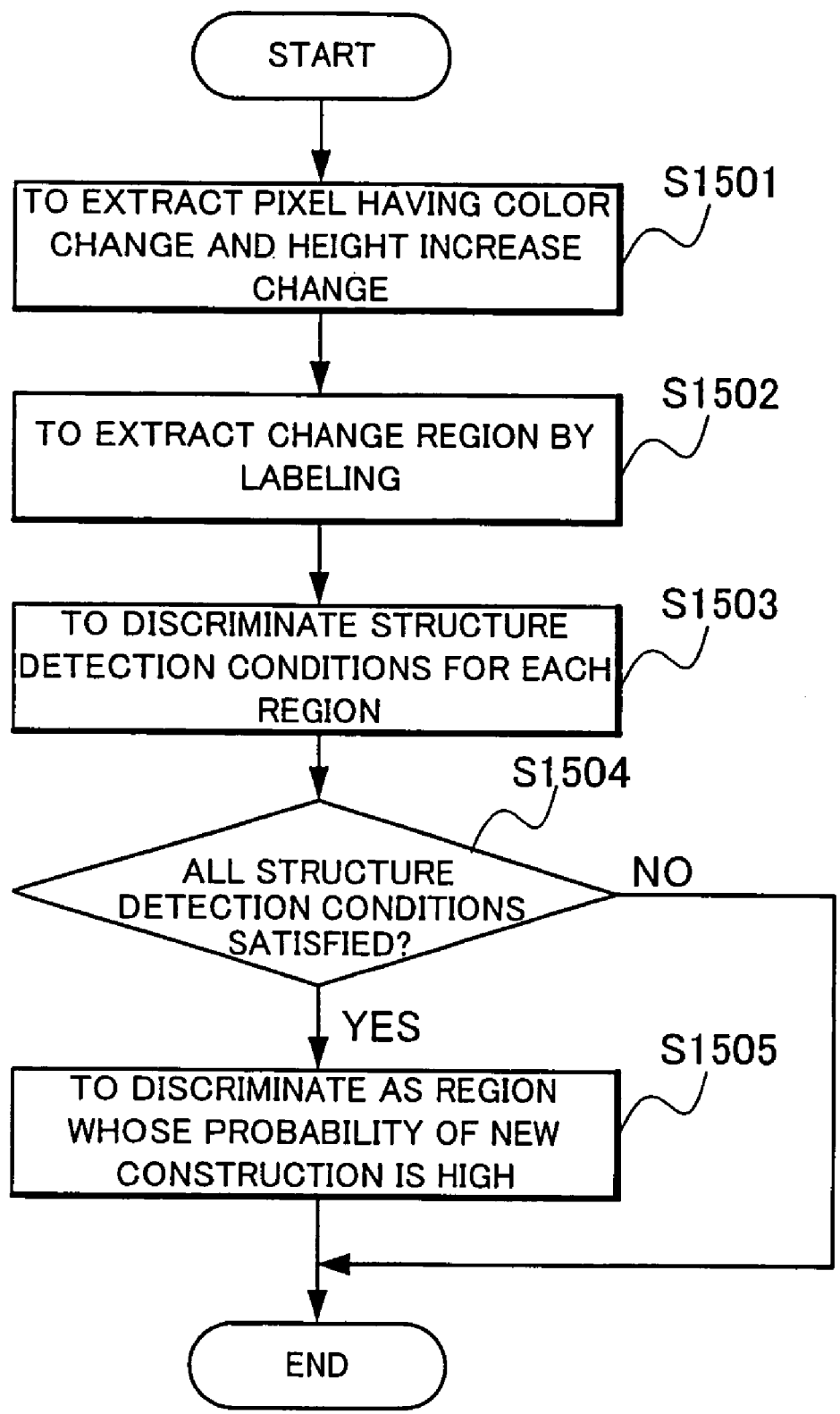
FIG. 15 is a flow chart showing one example of the progress of processing of discriminating new construction having a high probability of being new construction at a difference data discrimination unit in a variation example 2.

With reference to the flow chart shown in FIG. 15, new construction discriminating processing will be detailed.

In the new construction discriminating processing shown in FIG. 15, a region where a color change and a change of an increase in height occur is determined to be a region where new construction of a structure occurs and determined to be a region with a high accuracy of alteration which indicates to which extent the determination is accurate in a predetermined case.

Here, Step S1501 in FIG. 15 corresponds to Step S403 in FIG. 4 and Step S1502 to Step S1505 in FIG. 15 correspond to Step S404 in FIG. 4.

First, from color difference data and the height difference data, extract a pixel determined to have a color change in the color difference data and have a height increase change in the height difference data (Step S1501).

Hereafter, execute the same processing as the above-described new construction discriminating processing to determine, when structure detection conditions are satisfied, that the extracted region is a region of new construction and a region whose probability of new construction is high (Step S1502 to Step S1505).

Figure 16:
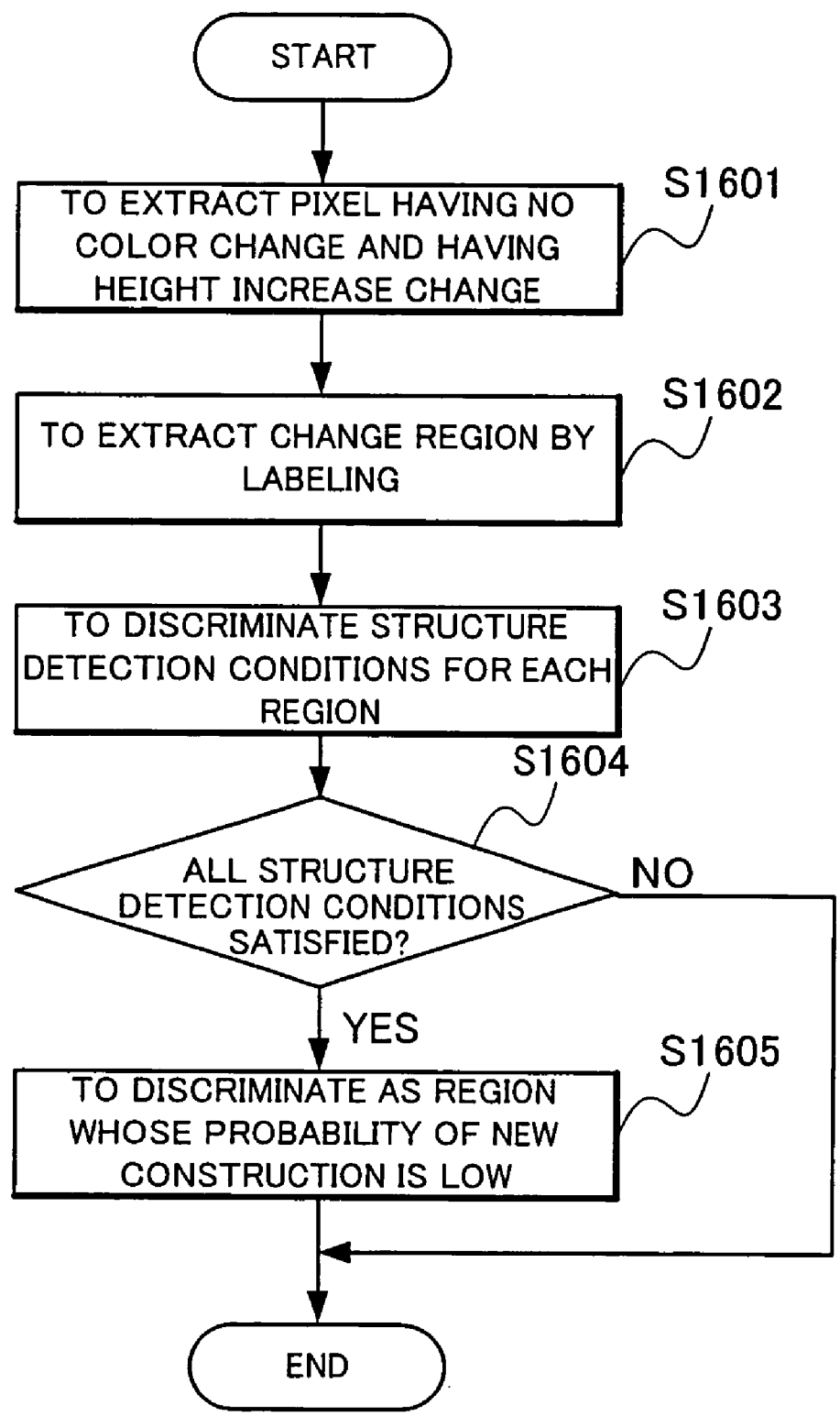
FIG. 16 is a flow chart showing one example of the progress of processing of discriminating new construction having a low probability of being new construction at the difference data discrimination unit in the variation example 2.

Next, with reference to the flow chart shown in FIG. 16, other new construction discriminating processing will be detailed.

In the new construction discriminating processing shown in FIG. 16, a region where no color change occurs and only a change of an increase in height occurs is determined to be a region where new construction of a structure occurs and determined to be a region with a low accuracy of the discriminated alteration in a predetermined case.

Here, Step S1601 in FIG. 16 corresponds to Step S403 in FIG. 4 and Step S1602 to Step S1605 in FIG. 16 correspond to Step S404 in FIG. 4.

First, from the color difference data and the height difference data, extract a pixel determined to have no color change in the color difference data and have a height increase change in the height difference data (Step S1601).

Hereafter, execute the same processing as the above-described new construction discriminating processing to determine, when the structure detection conditions are satisfied, that the extracted region is a region of new construction and a region whose probability of new construction is low (Step S1602 to Step S1605).

(Destruction Discriminating Processing)

Figure 17:
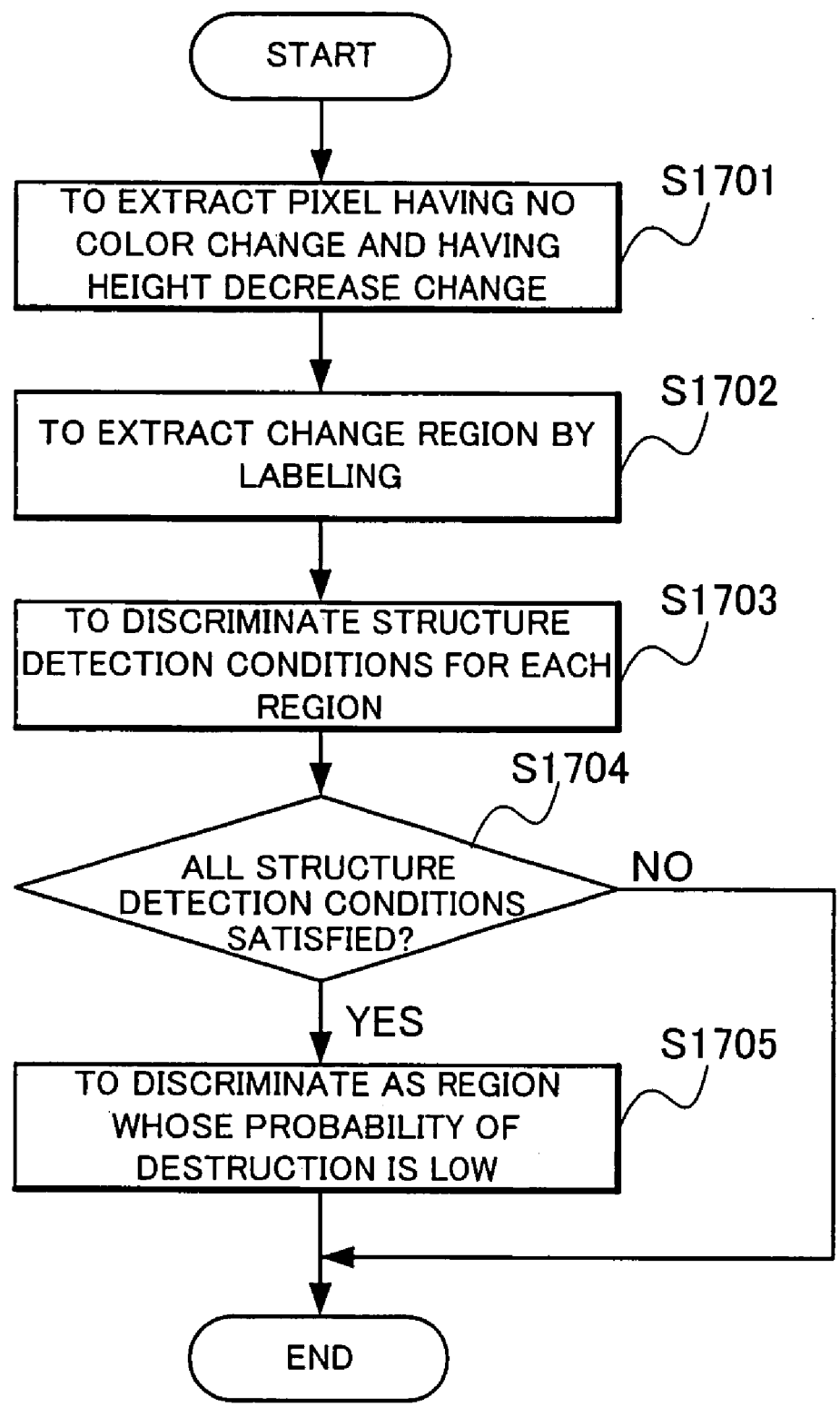
FIG. 17 is a flow chart showing one example of the progress of processing of discriminating destruction having a high probability of being destruction at the difference data discrimination unit in the variation example 2.

Next, with reference to the flow chart shown in FIG. 17, destruction discriminating processing will be detailed.

In the destruction discriminating processing shown in FIG. 17, a region where a color change and a change of a decrease in height occur is determined to be a region where destruction of a structure occurs and determined to be a region having a high accuracy of the discriminated alteration in a predetermined case.

Here, Step S1701 in FIG. 17 corresponds to Step S403 in FIG. 4 and Step S1702 to Step S1705 in FIG. 17 correspond to Step S404 in FIG. 4.

First, from the color difference data and the height difference data, extract a pixel determined to have a color change in the color difference data and have a change of a decrease in height in the height difference data (Step S1701).

Hereafter, execute the same processing as the above-described new construction discriminating processing to determine, when the structure detection conditions are satisfied, that the extracted region is a region of destruction and a region whose probability of destruction is high (Step S1702 to Step S1705).

(Destruction Discriminating Processing)

Figure 18:
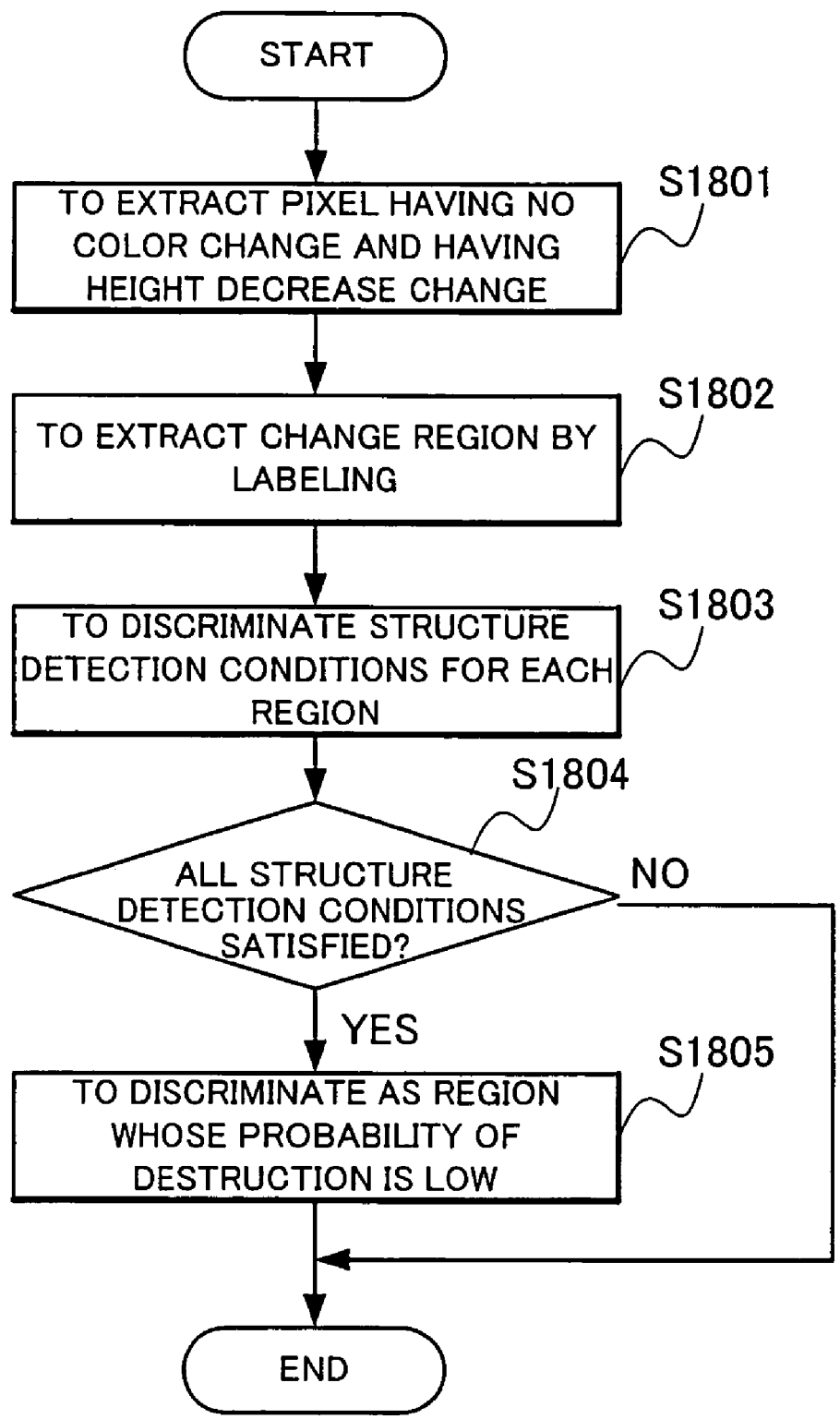
FIG. 18 is a flow chart showing one example of the progress of processing of discriminating destruction having a low probability of being destruction at the difference data discrimination unit in the variation example 2.

Next, with reference to the flow chart shown in FIG. 18, other destruction discriminating processing will be detailed.

In destruction discriminating processing, a region where no color change occurs and only a change of a decrease in height occurs is determined to be a region where destruction of a structure occurs and determined to be a region having a low accuracy of the discriminated alteration in a predetermined case.

Here, Step S1801 in FIG. 18 corresponds to Step S403 in FIG. 4 and Step S1802 to Step S1805 in FIG. 18 correspond to Step S404 in FIG. 4.

From the color difference data and the height difference data, extract a pixel determined to have no color change in the color difference data and determined to have a change of a decrease in height in the height difference data (Step S1801).

Hereafter, execute the same processing as the above-described new construction discriminating processing to determine that the extracted region is a region of destruction and a region whose probability of destruction is low (Step S1802 to Step S1805).

(Effects of Modification Example 2)

According to the modification example 2 described in the foregoing, new construction and destruction can be discriminated to higher precision than in the modification example 1.

The reason is that a region from which new construction and destruction are detected is discriminated and to which extent the discrimination is accurate is determined by combining a color difference and a height difference.

MODIFICATION EXAMPLE 3

The modification example 3 is to execute alteration discriminating processing with effects of a color change caused by environments such as snow and shadow removed by using a color value of each pixel of an ortho-image of a new time point and an ortho-image of an old time point.

Existence of snow and shadow exerts effects on images to cause an error in alteration discriminating processing. Using a value of a color of each pixel in an ortho-image of a new time point and in an ortho-image of an old time point enables discrimination of an alteration of a structure with the effects of luminance caused by snow and shadow removed.

It is possible to prevent alteration discrimination based on erroneous detection of a color change due to existence of snow or shadow, for example, by removing a pixel whose color value at a new time point or an old time point is higher than a predetermined luminance (whitish pixel) and a pixel whose color value is lower than a predetermined luminance (blackish pixel) from a region as a target of alteration discrimination.

(Contents of Alteration Discriminating Processing in Modification Example 3)

With reference to the flow charts in FIG. 19 and FIG. 20, detailed description will be made of pixel extraction processing in the modification example 3 which is applied to Step S403 in FIG. 4 and alteration discriminating processing in the modification example 3 which is applied to Step S404.

As alterations to be discriminated in the modification example 3, two kinds will be described, "alteration with a snow region removed from a target of alteration discrimination" and "alteration with a shadow region removed from a target of alteration discrimination".

(Alteration Discriminating Processing Executed with Snow Region Excluded)

Figure 19:
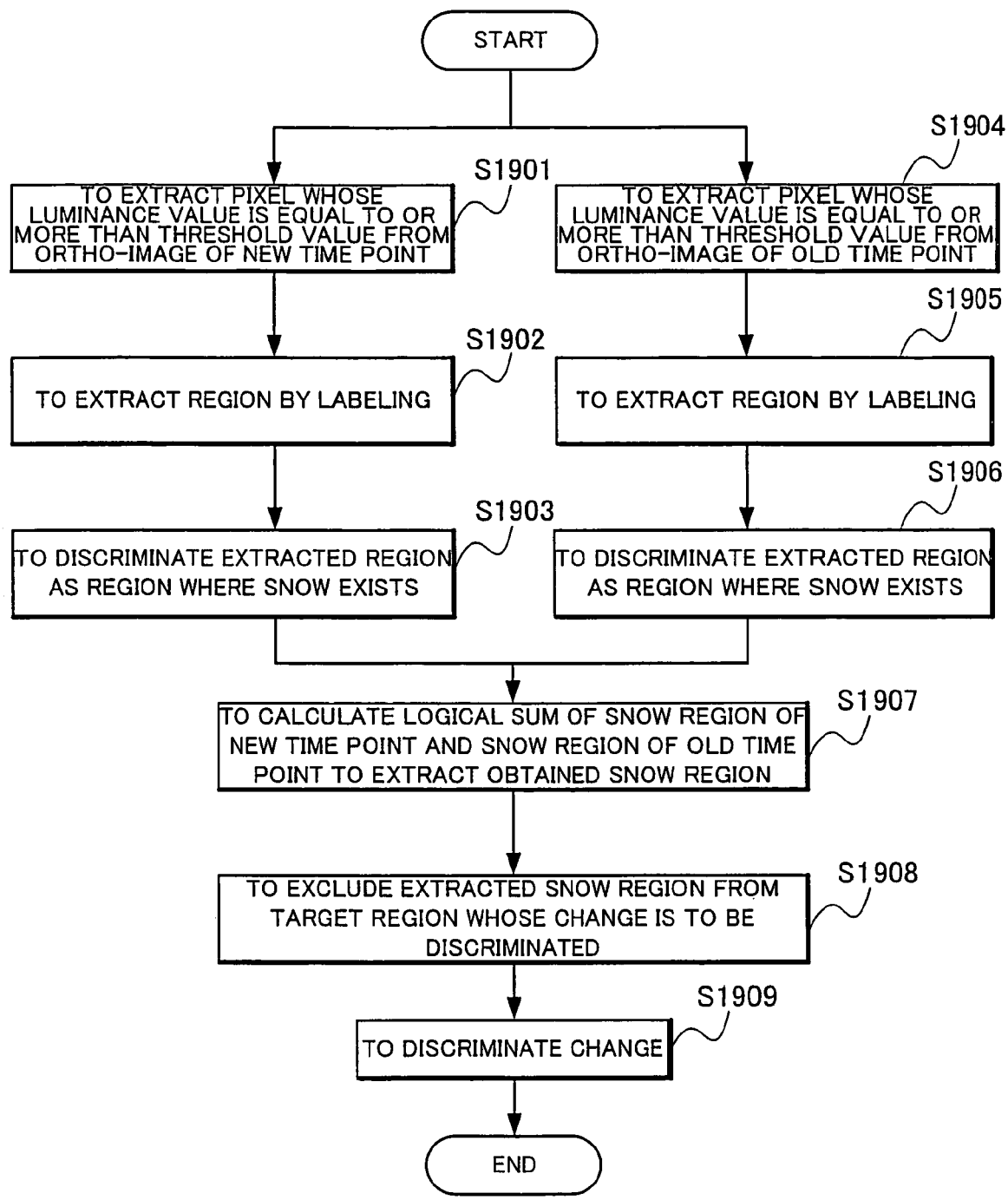
FIG. 19 is a flow chart showing one example of the progress of processing of excluding a snow region from discrimination which is executed at a difference data discrimination unit in a variation example 3.

With reference to the flow chart shown in FIG. 19, alteration discriminating processing with the effects of environmental changes due to the existence of snow excluded (alteration discriminating processing with a snow region excluded) will be detailed.

In alteration discriminating processing with a snow region removed, a region whose luminance is higher than a predetermined luminance is removed as a region where snow exists from a target of alteration discriminating processing.

Here, Step S1901 and Step S1904 in FIG. 19 correspond to Step S403 in FIG. 4 and Step S1902 and Step S1903, and Step S1905 to Step S1909 in FIG. 19 correspond to Step S404 in FIG. 4.

First, the difference data discrimination unit 53 receives input of an ortho-image of a new time point and an ortho-image of an old time point from the orthorectification unit 40 to extract a pixel whose luminance value is equal to or more than a threshold value set in advance from the applied ortho image of the new time point (Step S1901).

Subsequently, the difference data discrimination unit 53 executes labeling processing with respect to the extracted pixel to extract a region (Step S1902) and discriminate the extracted region as a snow region where snow exists (Step S1903).

Also as to the applied ortho-image of the old time point, the difference data discrimination unit 53 extracts a pixel whose luminance value is equal to or more than the threshold value set in advance in parallel to Step S1901 to Step S1903 (Step S1904), executes labeling processing with respect to the extracted pixel to extract a region (Step S1905) and discriminates the extracted region as a snow region (Step S1906).

As to the extracted snow regions of the new time point and the old time point, calculate the logical sum to extract a region where snow exists at any of the time points (Step S1907).

With the extracted snow region as a region to be excluded from a target region of alteration discriminating processing (Step S1908), execute alteration discriminating processing (Step S1909).

In other words, at the time of the alteration discriminating processing of the present modification example, discrimination is made with a snow region excluded from a target of alteration discriminating processing.

In addition, although the description has been made using a luminance value, discrimination may be made, using other arbitrary color space, that a pixel within a certain range in the color space is a snow region.

(Alteration Discriminating Processing Executed with Shadow Region Excluded)

Next, detailed description will be made of alteration discriminating processing with the effects of an environmental change caused by existence of shadow excluded (alteration discriminating processing with a shadow region excluded) with reference to the flow chart in FIG. 20.

In the alteration discriminating processing executed with a shadow region excluded, a region whose luminance is lower than a predetermined luminance is excluded as a region where shadow exists from a target of the alteration discriminating processing.

Figure 20:
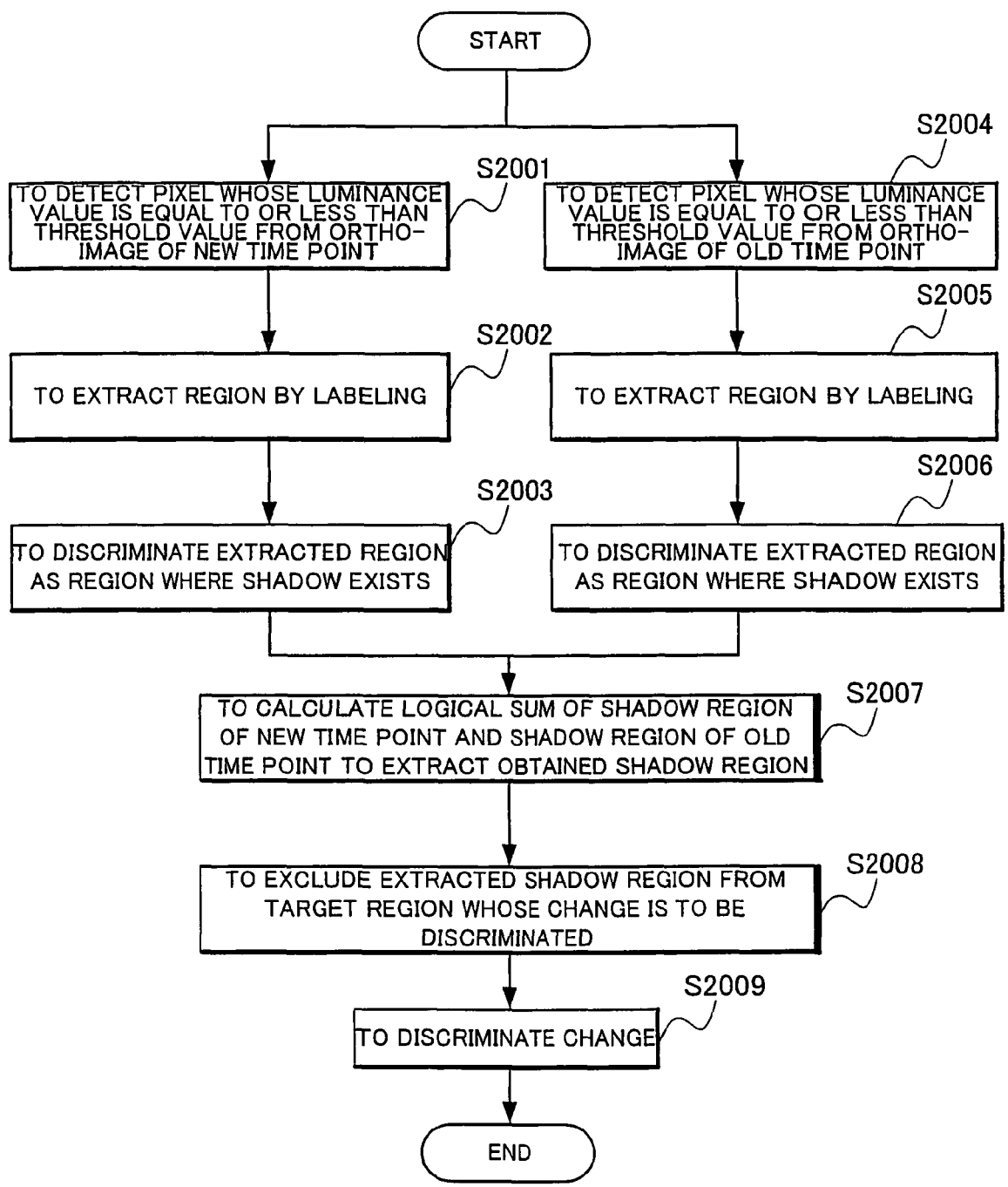
FIG. 20 is a flow chart showing one example of the progress of processing of excluding a shadow region from discrimination which is executed at the difference data discrimination unit in the variation example 3.

Here, Step S2001 and Step S2004 in FIG. 20 correspond to Step S403 in FIG. 4 and Step S2002 and Step S2003, and Step S2005 to Step S2009 in FIG. 20 correspond to Step S404 in FIG. 4.

First, the difference data discrimination unit 53 receives input of an ortho-image of a new time point and an ortho-image of an old time point from the orthorectification unit 40 to extract a pixel whose luminance value is equal to or less than a threshold value set in advance from the applied ortho image of the new time point (Step S2001).

Subsequently, the difference data discrimination unit 53 executes labeling processing with respect to the extracted pixel to extract a region (Step S2002) and discriminates the extracted region as a shadow region where shadow exists (Step S2003).

Also as to the ortho-image of the old time point, the difference data discrimination unit 53 extracts a pixel whose luminance value is equal to or less than the threshold value set in advance in parallel to Step S2001 to Step S2003 (Step S2004), executes labeling processing with respect to the extracted pixel to extract a region (Step S2005) and discriminates the extracted region as a shadow region (Step S2006).

As to the extracted shadow regions of the new time point and the old time point, calculate the logical sum to extract a region where shadow exists at any of the time points (Step S2007).

With the extracted shadow region as a region to be excluded from a target region whose alteration is to be discriminated (Step S2008), execute alteration discrimination (Step S2009).

In other words, at the time of the alteration discriminating processing of the present modification example, discrimination is made with a shadow region excluded from a target of alteration discriminating processing.

Although the description has been made using a luminance value, discrimination may be made, using other arbitrary color space, that a pixel within a certain range in the color space is a shadow region.

(Effects of Modification Example 3)

According to the modification example 3 described in the foregoing, alteration of a structure can be discriminated even when a color of an image changes due to the effects of snow or shadow.

The modification example 3 further prevents alteration discrimination based on erroneous detection of a color change due to existence of snow or shadow.

The reason is that an alteration is discriminated by extracting a region whose image has snow or shadow existing to exclude the region from a region as a target of discrimination of a structure alteration based on a luminance value of image data.

MODIFICATION EXAMPLE 4

The modification example 4 is to execute processing of discriminating "new construction", "expansion", "destruction" and "reduction" by using altitude data having an altitude value of a ground surface in addition to information about a color change and information about a height change of a feature on the earth by the difference data discrimination unit 53.

Here, "expansion" represents addition of a new structure to an already existing structure or construction of a tall structure after once destructing a structure, while "reduction" represents destruction of only a part of a second floor of a structure or construction of a lower structure after once destructing a structure.

(Contents of Alteration Discriminating Processing in Modification Example 4)

With reference to the flow charts in FIG. 21 and FIG. 22, detailed description will be made of pixel extraction processing in the modification example 4 which is applied to Step S403 in FIG. 4 and alteration discriminating processing in the modification example 4 which is applied to Step S404.

As alterations to be discriminated in the modification example 4, two kinds will be described "expansion" and "reduction".

(Expansion Discriminating Processing)

With reference to the flow chart shown in FIG. 21, expansion discriminating processing will be described in detail.

Figure 21:
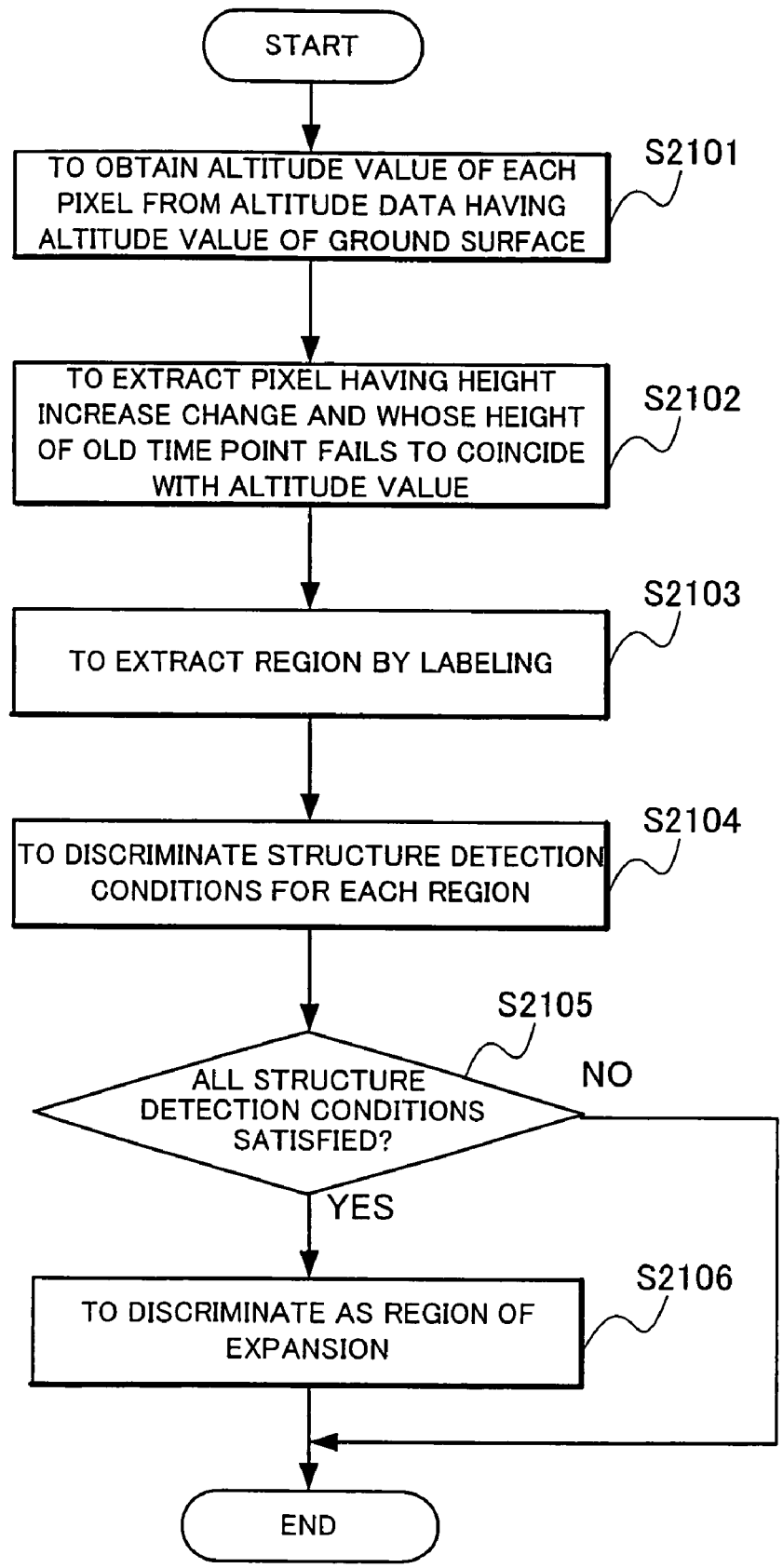
FIG. 21 is a flow chart showing one example of the progress of processing of discriminating expansion at a difference data discrimination unit in a variation example 4.

Here, Step S2101 and Step S2102 in FIG. 21 correspond to Step S403 in FIG. 4 and Step S2103 to Step S2106 in FIG. 21 correspond to Step S404 in FIG. 4.

First, the difference data discrimination unit 53 receives input of altitude data having an altitude value of a ground surface to obtain an altitude value corresponding to each pixel of height difference data (Step S2101).

Subsequently, the difference data discrimination unit 53 extracts a pixel having a change of a height increase and having a height of an old time point which fails to coincide with the altitude value of the ground surface based on the height difference data and the altitude value (Step S2102).

Hereafter, execute the same processing as the new construction discriminating processing in the modification example 1 to determine, when the structure detection conditions are satisfied, that the region is a region of expansion (Step S2103 to Step S2106).

When the pixel extracted at Step S2102 is a pixel having a change of a height increase and having a height of the old time point which coincides with the altitude value of the ground surface, it can be determined that the region is a region of new construction by the above-described Step S2103 to Step S2106.

(Reduction Discriminating Processing)

Next, detailed description will be made of reduction discriminating processing with reference to the flow chart in FIG. 22.

Figure 22:
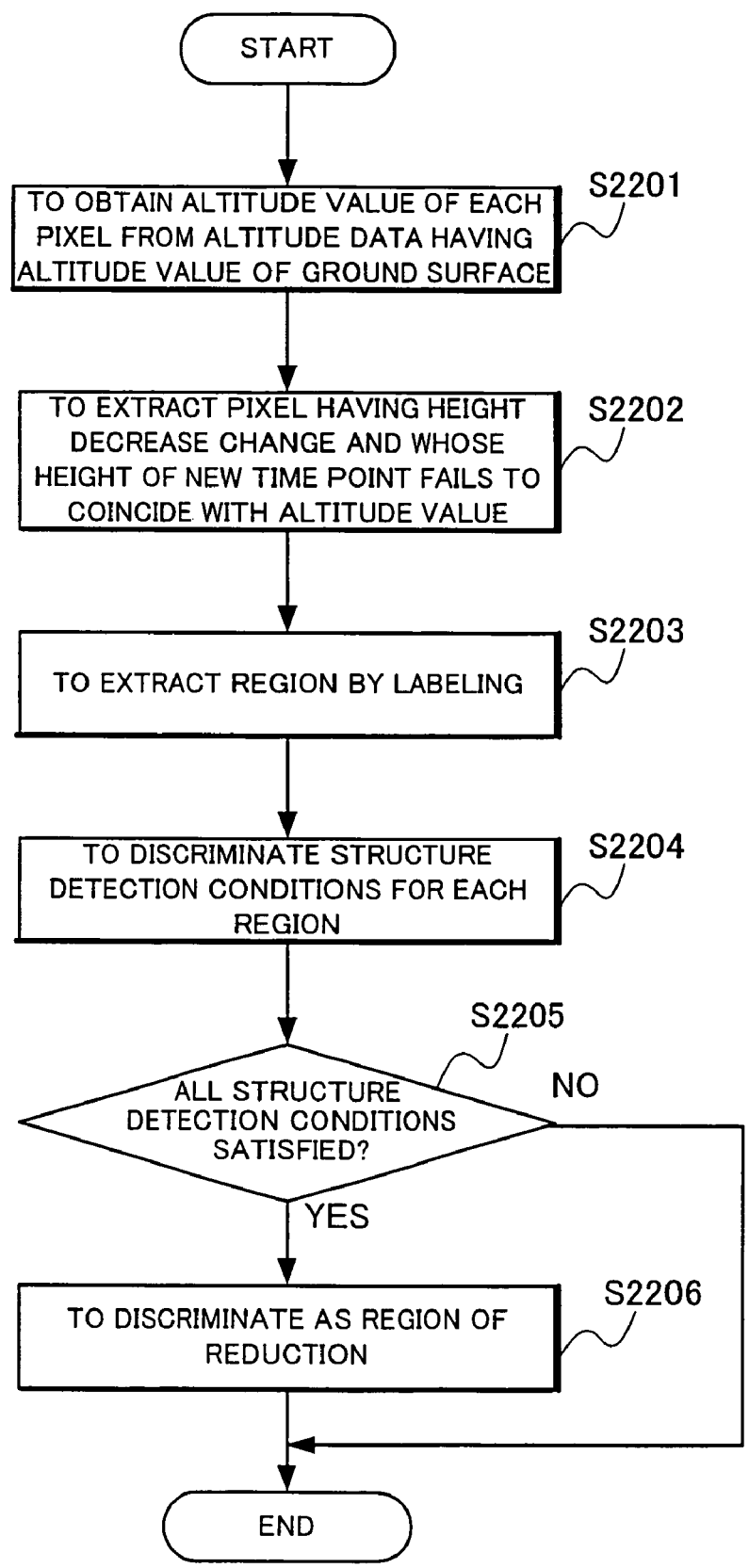
FIG. 22 is a flow chart showing one example of the progress of processing of discriminating reduced construction which is executed at the difference data discrimination unit in the variation example 4.

Here, Step S2201 and Step S2202 in FIG. 22 correspond to Step S403 in FIG. 4 and Step S2203 to Step S2206 in FIG. 22 correspond to Step S404 in FIG. 4.

First, the difference data discrimination unit 53 receives input of altitude data having an altitude value of a ground surface to obtain an altitude value corresponding to each pixel of height difference data (Step S2201).

Subsequently, the difference data discrimination unit 53 extracts a pixel having a change of a height decrease and having a height of the new time point which fails to coincide with the altitude value of the ground surface based on the height difference data and the altitude value (Step S2202).

Hereafter, execute the same processing as the above-described new construction discriminating processing to determine, when the structure detection conditions are satisfied, that the region is a region of reduction (Step S2203 to Step S2206).

When the pixel extracted at Step S2202 is a pixel having a change of a height decrease and having a height of the new time point which coincides with the altitude value of the ground surface, it can be determined that the region is a region of destruction by the above-described Step S2203 to Step S2206.

(Effects of the Modification Example 4)

According to the modification example 4 described in the foregoing, alteration of a structure can be discriminated in detail separately with respect to new construction and expansion, and destruction and reduction.

The reason is that alteration of a structure is discriminated by using altitude data having an altitude value of a ground surface in addition to information about a color change and information about a height change of a structure.

MODIFICATION EXAMPLE 5

The modification example 5 is to execute quantitative alteration discriminating processing by combining color difference data and height difference data.

(Contents of Alteration Discriminating Processing in Modification Example 5)

With reference to the flow charts in FIG. 23 and FIG. 24, detailed description will be made of pixel extraction processing in the modification example 5 which is applied to Step S403 in FIG. 4 and alteration discriminating processing in the modification example 5 which is applied to Step S404.

(Height Change Based Quantitative Alteration Discriminating Processing)

Next, detailed description will be made of quantitative alteration discriminating processing based on a height change with reference to the flow chart in FIG. 23.

Figure 23:
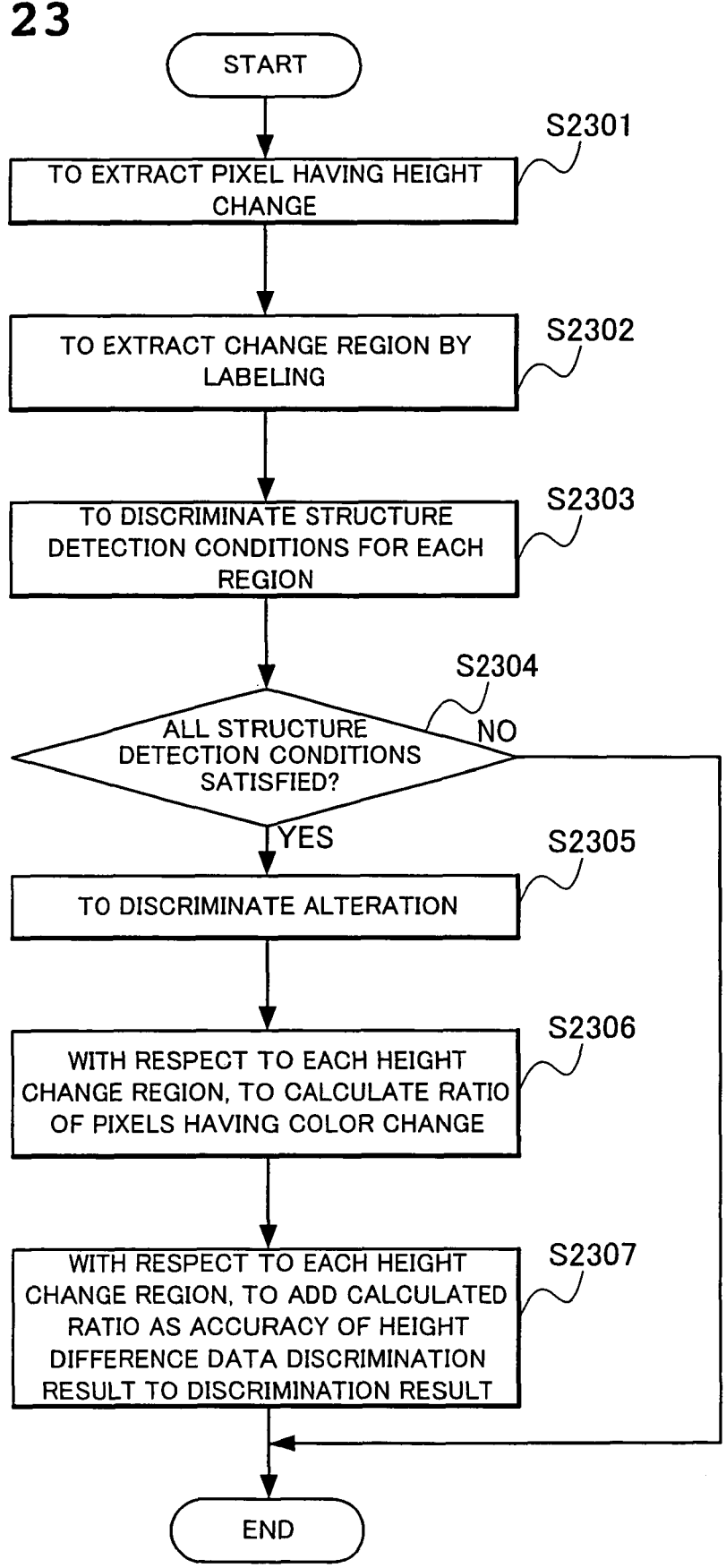
FIG. 23 is a flow chart showing one example of the progress of processing of quantitative discrimination on a height change basis at a difference data discrimination unit in a variation example 5.

Here, Step S2301 in FIG. 23 corresponds to Step S403 in FIG. 4 and Step S2302 to Step S2305 in FIG. 23 correspond to Step S404 in FIG. 4.

First, from the height difference data, extract a pixel determined to have a height change in the height difference data (Step S2301).

Subsequently, similarly to the new construction discriminating processing in the modification example 1, execute labeling processing with respect to the extracted pixel to regard pixels having the same label as one label region (Step S2302) and discriminate structure detection conditions with respect to each label region (Step S2303).

With respect to each label region satisfying all the structure detection conditions (Step S2304), discriminate an alteration of a structure (Step S2305), calculate a ratio of pixels determined to have a color change to the pixels in the label region (Step S2306), and with the calculated ratio considered as an accuracy of alteration of each label region, output a discrimination result with the alteration accuracy included (Step S2307).

(Color Change Based Quantitative Alteration Discriminating Processing)

Next, detailed description will be made of color change based quantitative alteration discriminating processing with reference to the flow chart in FIG. 24.

Figure 24:
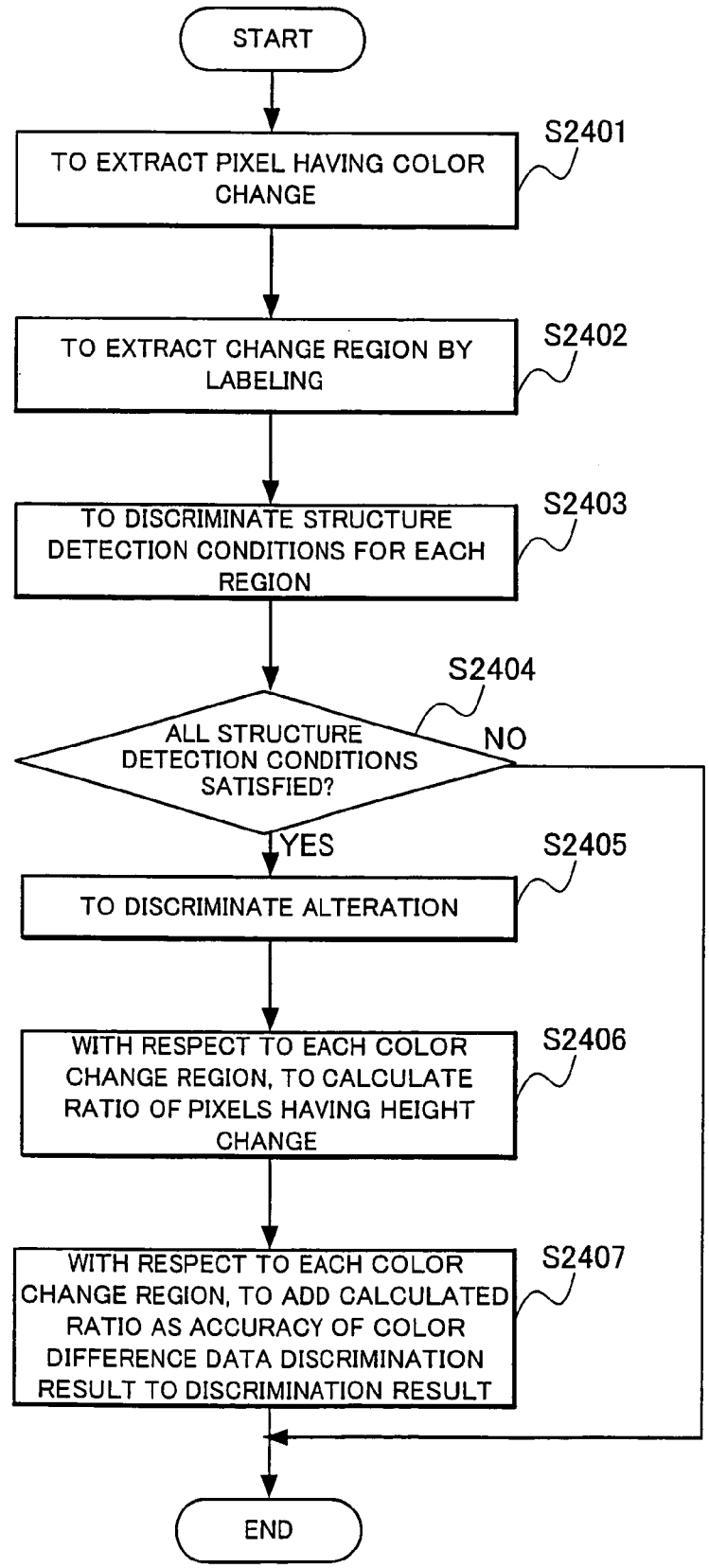
FIG. 24 is a flow chart showing one example of the progress of processing of quantitative discrimination on a color change basis at the difference data discrimination unit in the variation example 5.

Here, Step S2401 in FIG. 24 corresponds to Step S403 in FIG. 4 and Step S2402 to Step S2405 in FIG. 24 correspond to Step S404 in FIG. 4.

First, from the color difference data, extract a pixel determined to have a color change in the color difference data (Step S2401).

Subsequently, similarly to the new construction discriminating processing in the modification example 1, execute labeling processing with respect to the extracted pixel to regard pixels having the same label as one label region (Step S2402) and discriminate structure detection conditions with respect to each label region (Step S2403).

With respect to each label region satisfying all the structure detection conditions (Step S2404), discriminate an alteration of a structure (Step S2405), calculate a ratio of pixels determined to have a height change to the pixels in the label region (Step S2406), and with the calculated ratio considered as an accuracy of alteration of each label region, output a discrimination result with the alteration accuracy included (Step S2407).

(Effects of Modification Example 5)

According to the modification example 5 described in the foregoing, it is possible to grasp how accurate a discriminated alteration is (accuracy of alteration).

The reason is that quantitative alteration discriminating processing is executed by combining color difference data and height difference data, calculating a ratio of pixels whose color or height changes and using the calculated ratio as an index for evaluating an alteration.

MODIFICATION EXAMPLE 6

The modification example 6 is to execute discrimination processing by using a shape of a structure.

Used as a shape of a structure in the modification example 6 may be two-dimensional shape data of a structure which is included in map data, a two-dimensional shape of a structure which is extracted by region division processing according to a color by using ortho-image data, or a two-dimensional shape of a structure which is extracted by region division processing according to a height by using ortho-DSM image data.

Region division processing here represents processing of dividing image data into a plurality of small regions with pixels having similar features as a unit.

In region division processing using a color, for example, with pixels having similar colors as a unit, data is divided into a plurality of regions and in region division processing using a height, with pixels having similar heights as a unit, data is divided into a plurality of regions.

Although as a method of executing region division processing, numbers of methods have been conventionally proposed to have variation existing, no limitation is imposed on a method used in the region division processing in the present modification example.

Region division processing may be executed by using, for example, K mean algorithm recited in "Hiromasa Nakatani, Kenji Oosaki and Keiichi Abe: Target Boundary Line Detection Based on Division Result of A Plurality of Regions, the Articles of the Institute of Electronics, Information and Communication Engineers of Japan (D-II) J76-D-II, 4, pp. 914-916 (1993-04)" or SNAKES recited in "M. Kass, A. Witkin, and D. Terzopoulos: SNAKES; Active Contour Models, the International Journal of Computer Vision, 1, pp. 321-331, 1988".

(Contents of Discrimination Processing in Modification Example 6)

With reference to the flow charts in FIG. 25 to FIG. 27, detailed description will be made of difference data extraction processing in the modification example 6 which is applied to Step S402 in FIG. 4, pixel extraction processing in the modification example 6 which is applied to Step S403 in FIG. 4 and alteration discriminating processing in the modification example 6 which is applied to Step S404.

(New Construction Discriminating Processing Using Shape of Structure)

Detailed description will be made of new construction discriminating processing using a shape of a structure with reference to the flow chart in FIG. 25.

Figure 25:
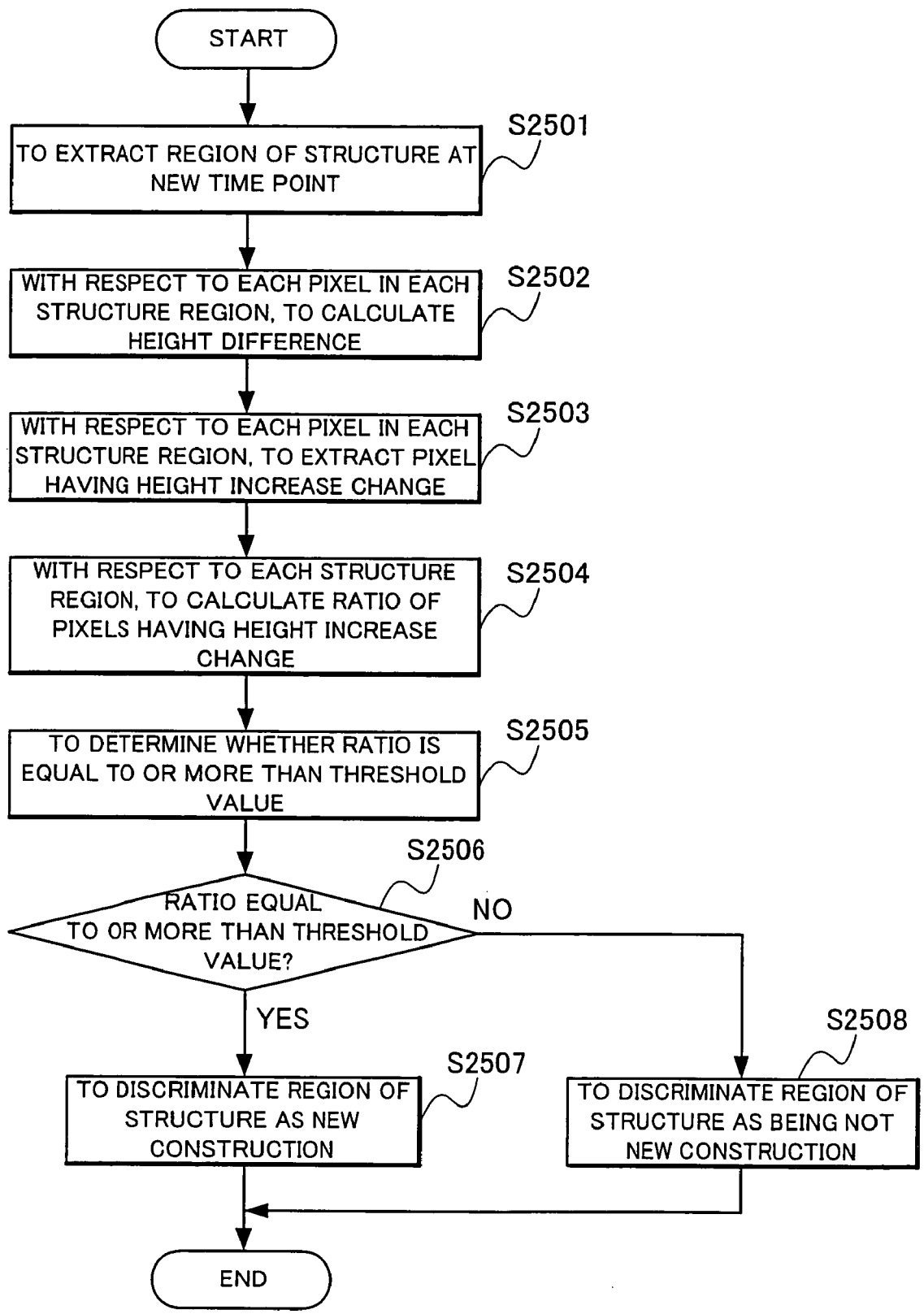
FIG. 25 is a flow chart showing one example of the progress of processing of discriminating new construction by using a shape of a structure which is executed at a difference data discrimination unit in a variation example 6.

Here, Step S2502 in FIG. 25 corresponds to Step S402 in FIG. 4, Step S2503 in FIG. 25 corresponds to Step S403 in FIG. 4 and Step S2504 to Step S2508 in FIG. 25 correspond to Step S404 in FIG. 4.

First, extract a region of each structure at a new time point (Step S2501).

Here, a region of a structure may be a closed region surrounded by a contour of the structure which is obtained by structure shape data or may be a region obtained by region division.

Subsequently, calculate a height difference with respect to each pixel in the region of the structure (Step S2502).

Subsequently, extract a pixel having a height increase change with respect to each pixel in the region of the structure (Step S2503).

Subsequently, with respect to each structure region, calculate a ratio of pixels having a height increase change to the region of the structure (Step S2504).

Determine whether the calculated ratio is equal to or more than a threshold value set in advance (Step S2505) and when it is equal to or more than the threshold value (Step S2506), determine that the region of the structure is new construction (Step S2507) and when it is less than the threshold value (Step S2506), determine that the region of the structure is not new construction (Step S2508).

(Destruction Discriminating Processing Using Shape of Structure)

Detailed description will be made of destruction discriminating processing using a shape of a structure with reference to the flow chart in FIG. 26.

Figure 26:
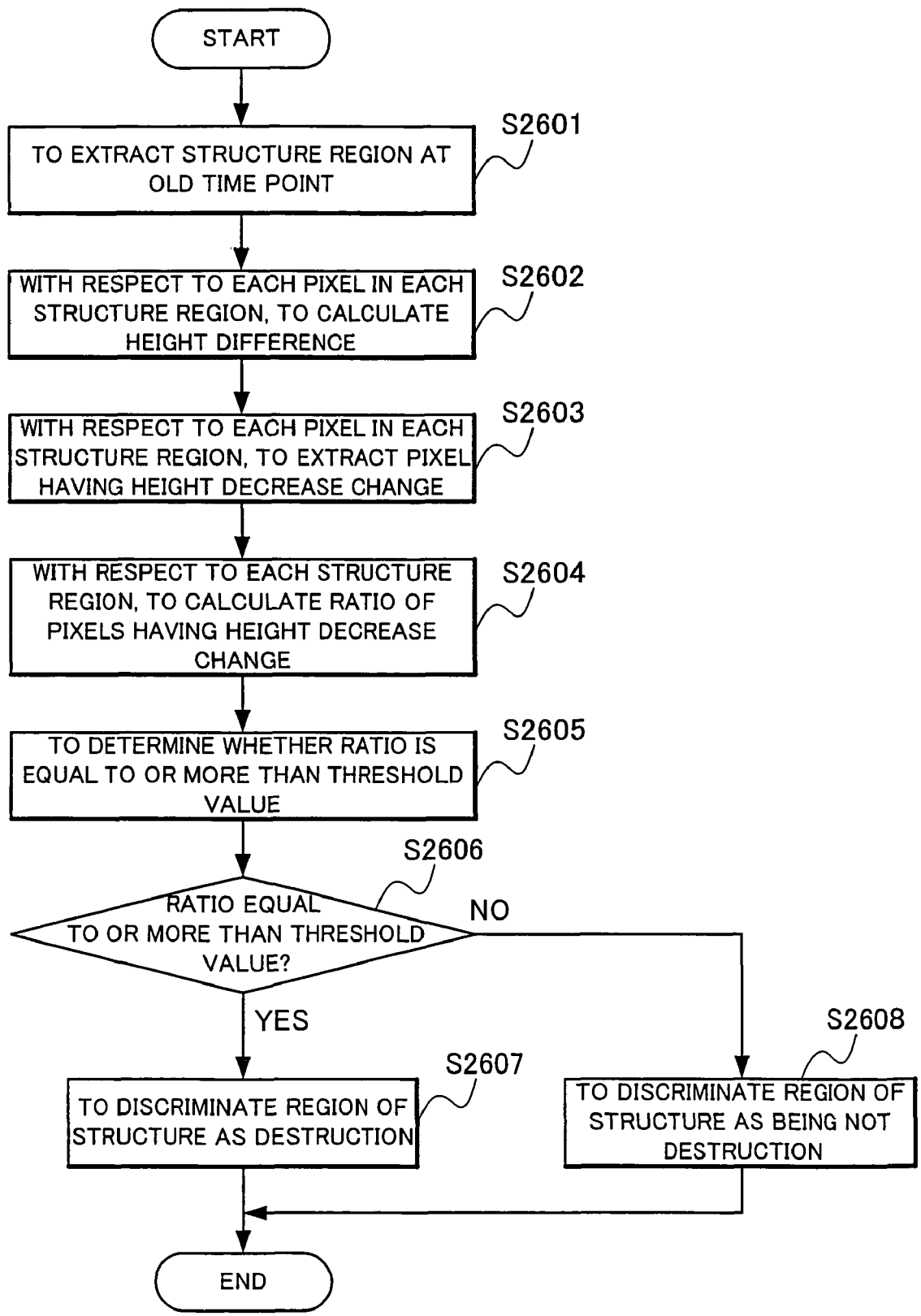
FIG. 26 is a flow chart showing one example of the progress of processing of discriminating destruction by using a shape of a structure which is executed at the difference data discrimination unit in the variation example 6.

Here, Step S2602 in FIG. 26 corresponds to Step S402 in FIG. 4, Step S2603 in FIG. 26 corresponds to Step S403 in FIG. 4 and Step S2604 to Step S2608 in FIG. 26 correspond to Step S404 in FIG. 4.

First, extract a region of each structure at an old time point (Step S2601).

Here, the structure region extraction processing may employ the same method as that of the new construction discriminating processing shown above in FIG. 25.

Subsequently, calculate a height difference with respect to each pixel in the region of the structure (Step S2602).

Subsequently, extract a pixel having a height decrease change with respect to each pixel in the region of the structure (Step S2603).

Subsequently, with respect to each structure region, calculate a ratio of pixels having a height decrease change to the region of the structure (Step S2604).

Subsequently, determine whether the calculated ratio is equal to or more than a threshold value set in advance (Step S2605) and when it is equal to or more than the threshold value (Step S2606), determine that the region of the structure is destruction (Step S2607) and when it is less than the threshold value (Step S2606), determine that the region of the structure is not destruction (Step S2608).

(Reform Discriminating Processing Using Shape of Structure)

Detailed description will be made of reform discriminating processing using a shape of a structure with reference to the flow chart in FIG. 27.

Figure 27:
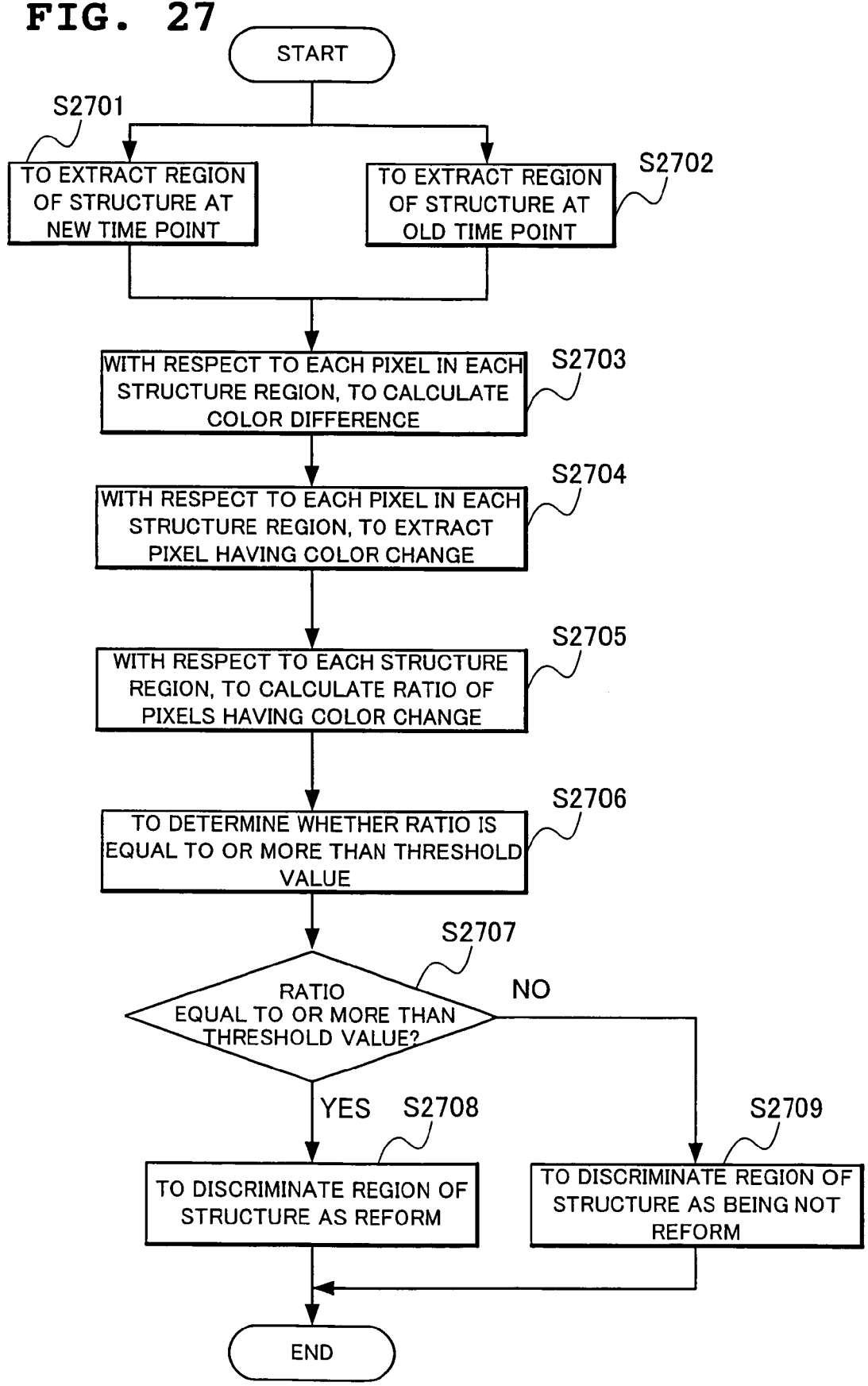
FIG. 27 is a flow chart showing one example of the progress of processing of discriminating reform by using a shape of a structure which is executed at the difference data discrimination unit in the variation example 6.

Here, Step S2703 in FIG. 27 corresponds to Step S402 in FIG. 4, Step S2704 in FIG. 27 corresponds to Step S403 in FIG. 4 and Step S2705 to Step S2709 in FIG. 27 correspond to Step S404 in FIG. 4.

First, extract each structure region at an old time point and a new time point (Step S2701 and Step S2702).

Here, the structure region extraction processing may employ the same method as that of the new construction discriminating processing shown above in FIG. 25.

Subsequently, calculate a color difference with respect to each pixel in the region of the structure (Step S2703).

Subsequently, extract a pixel having a color change with respect to each pixel in the region of the structure (Step S2704).

Subsequently, with respect to each structure region, calculate a ratio of pixels having a color change to the region of the structure (Step S2705).

Subsequently, determine whether the calculated ratio is equal to or more than a threshold value set in advance (Step S2706) and when it is equal to or more than the threshold value (Step S2707), determine that the region of the structure is reform (Step S2708) and when it is less than the threshold value (Step S2707), determine that the region of the structure is not reform (Step S2709).

(Effects of Modification Example 6)

According to the modification example 6 described in the foregoing, it is possible to discriminate alteration on a structure shape basis.

The reason is that alteration is discriminated by using a shape of a structure with pixels having similar colors or heights as a unit which is extracted from a region of a structure indicated in map data or from regions obtained by division.

(Second Embodiment)

The second embodiment is to execute discrimination processing with resolutions of aerial photographs taken at a new time point and an old time point made coincident with each other.

The second embodiment differs from the above-described first embodiment which is applied to a case where resolutions of aerial photographs taken at both a new time point and an old time point are equal in that it is applied to a case where resolutions of aerial photographs taken at both a new time point and an old time point are different.

(Structure of Second Embodiment)

A change discrimination device 100 according to the second embodiment, as compared with the change discrimination device 100 according to the first embodiment, is the same in basic structure but differs in that a new time point image data input unit 10 and an old time point image data input unit 20 have the function of making resolutions of aerial image data taken at both a new time point and an old time point coincide by using expansion/reduction processing.

More specifically, the new time point image data input unit 10 according to the present embodiment, at the time of receiving input of a plurality of aerial images of a new time point, converts the images by using expansion/reduction processing such that resolutions of the plurality of aerial images of the new time point attain a predetermined resolution.

Similarly, the old time point image data input unit 20 according to the present embodiment, at the time of receiving input of a plurality of aerial images of an old time point, converts the images by using expansion/reduction processing such that resolutions of the plurality of aerial images of the old time point attain a predetermined resolution.

Expansion/reduction processing is one example of processing for making resolutions be coincident, for which processing, other method may be used.

Although a predetermined resolution here represents a preset resolution common to each aerial image data, it can be not a preset resolution which is common to each aerial image data but a resolution of any one of a plurality of aerial image data of a new time point or a plurality of aerial image data of an old time point.

In addition, as an example of the second embodiment, image conversion is executed by the new time point image data input unit 10 and the old time point image data input unit 20, the image conversion may be executed by a discrimination unit 50.

Figure 28:
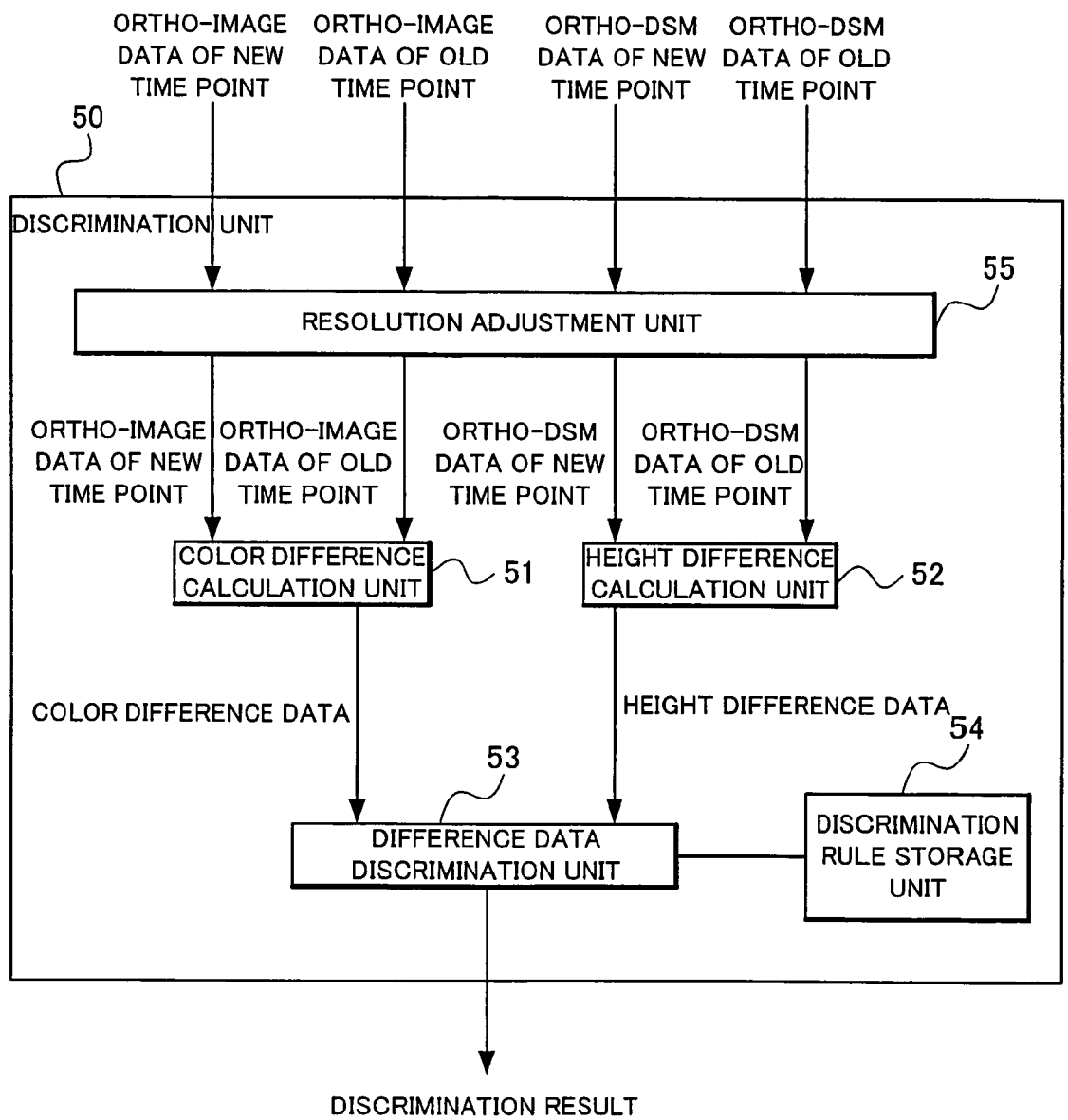
FIG. 28 is a block diagram showing one example of a structure of a discrimination unit of a change discrimination device according to a second embodiment.

FIG. 28 is a block diagram showing a structure of the discrimination unit 50 according to the present embodiment.

The discrimination unit 50 according to the present embodiment, as compared with the discrimination unit 50 according to the first embodiment, is the same in basic structure but differs in including a resolution adjustment unit 55.

The resolution adjustment unit 55 receives input of ortho-image data of a new time point, ortho-image data of an old time point, ortho-DSM data of a new time point and ortho-DSM data of an old time point, adjusts a resolution by executing image conversion using expansion/reduction processing such that a resolution of each image data and DSM data attains a predetermined resolution, outputs each ortho-image data whose resolution is adjusted to a color difference calculation unit 51 and outputs each image-converted ortho-DSM data to a height difference calculation unit 52.

Although a predetermined resolution here represents a separately provided resolution common to each data, it can be not a resolution separately provided common to each data but a resolution of any one of ortho-image data of a new time point, ortho-image data of an old time point, ortho-DSM data of a new time point and ortho-DSM data of an old time point.

(Operation of Second Embodiment)

Operation of the present embodiment, when the new time point image data input unit 10 and the old time point image data input unit 20 make resolutions of aerial photographs taken at both a new time point and an old time point be coincident by using expansion/reduction processing, differs from operation of the first embodiment in using expansion/reduction processing to make resolutions of aerial photographs taken at both new and old time points coincident prior to Step S401 in the first embodiment shown in FIG. 4, and the processing is executed by using the image-converted aerial image data, and is the same as the operation of the first embodiment in the following processing.

Operation of the present embodiment, when the resolution adjustment unit 55 is provided, differs from the operation of the first embodiment in using expansion/reduction processing to make resolutions of ortho-image data and ortho-DSM data at both new and old time points be coincident between Step S401 and Step S402 of the first embodiment shown in FIG. 4, and the processing is executed by using the image-converted data, and is the same as the operation of the first embodiment in the following processing.

(Effects of Second Embodiment)

According to the second embodiment described in the foregoing, it is possible to discriminate an alteration of a feature on the earth by the same method as that of the first embodiment even when resolutions of aerial photographs taken at both new and old time points are different.

The reason is that resolutions of aerial image data of both new and old time points or data obtained by orthorectifying aerial image data of both the new and old time points are made coincident with each other by using expansion/reduction processing at the new time point image data input unit 10 and the old time point image data input unit 20, or the resolution adjustment unit 55.

(Third Embodiment)

The third embodiment is to execute discrimination processing by obtaining a photographing range common to aerial photographs taken at both new and old time points.

The third embodiment differs from the above-described first embodiment which is applied to a case where photographing ranges of aerial photographs taken at both new and old time points are coincident in that it is applied to a case where photographing ranges of aerial photographs taken at both new and old time points are different.

(Structure of Third Embodiment)

Figure 29:
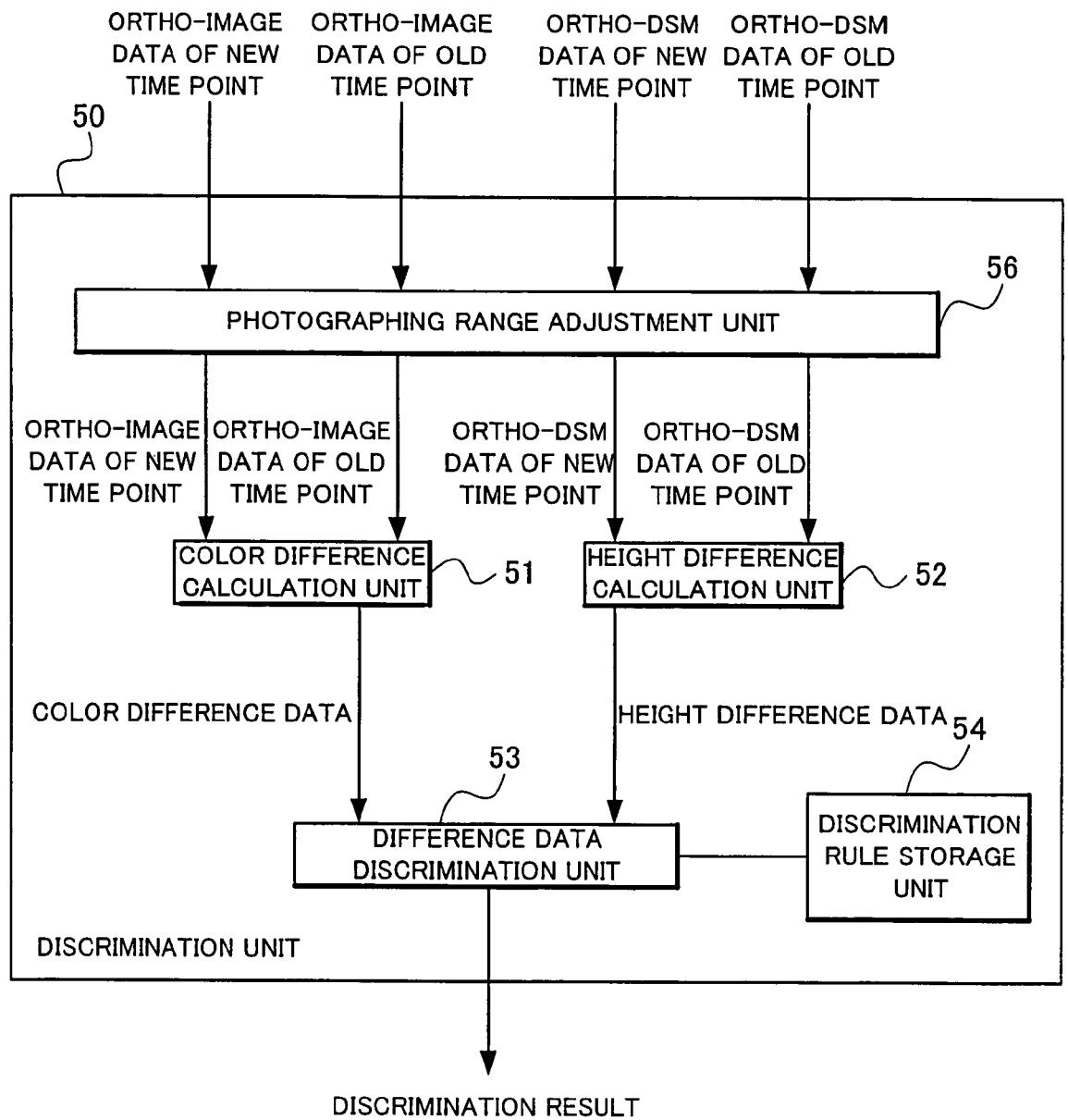
FIG. 29 is a block diagram showing one example of a structure of a discrimination unit of a change discrimination device according to a third embodiment.

FIG. 29 is a block diagram showing a structure of a discrimination unit 50 according to the present embodiment.

The discrimination unit 50 of a change discrimination device 100 according to the third embodiment, as compared with the discrimination unit 50 of the change discrimination device 100 according to the first embodiment, is the same in basic structure but differs in including a photographing range adjustment unit 56.

More specifically, the photographing range adjustment unit 56 receives input of ortho-image data of a new time point, ortho-image data of an old time point, ortho-DSM data of a new time point and ortho-DSM data of an old time point, calculates a range of actual coordinates (proper position) common to all applied data, obtains a range of coordinates on each data corresponding to the range of the actual coordinates (proper position), outputs each ortho-image data whose coordinate range is obtained to a color difference calculation unit 51 and outputs each ortho-DSM data whose coordinate range is obtained to a height difference calculation unit 52.

Since a relationship between actual coordinates (proper position) and coordinates on a image is determined with respect to each ortho-image data and each ortho-DSM data by absolute orientation, a range of actual coordinates (proper position) common to each data can be obtained to obtain a range of coordinates on each data corresponding to the range of actual coordinates (proper position).

In addition, while as one example of the third embodiment, the method has been described of extracting a common part of aerial photograph photographing ranges at both new and old time points, it is possible to receive input of a plurality of ortho-image data and ortho-DSM data and extract ortho-image data and ortho-DSM data corresponding to a range of predetermined actual coordinates (proper position) to generate, by linking the data, ortho-image data and ortho-DSM data for use in alteration discriminating processing.

Figure 34:
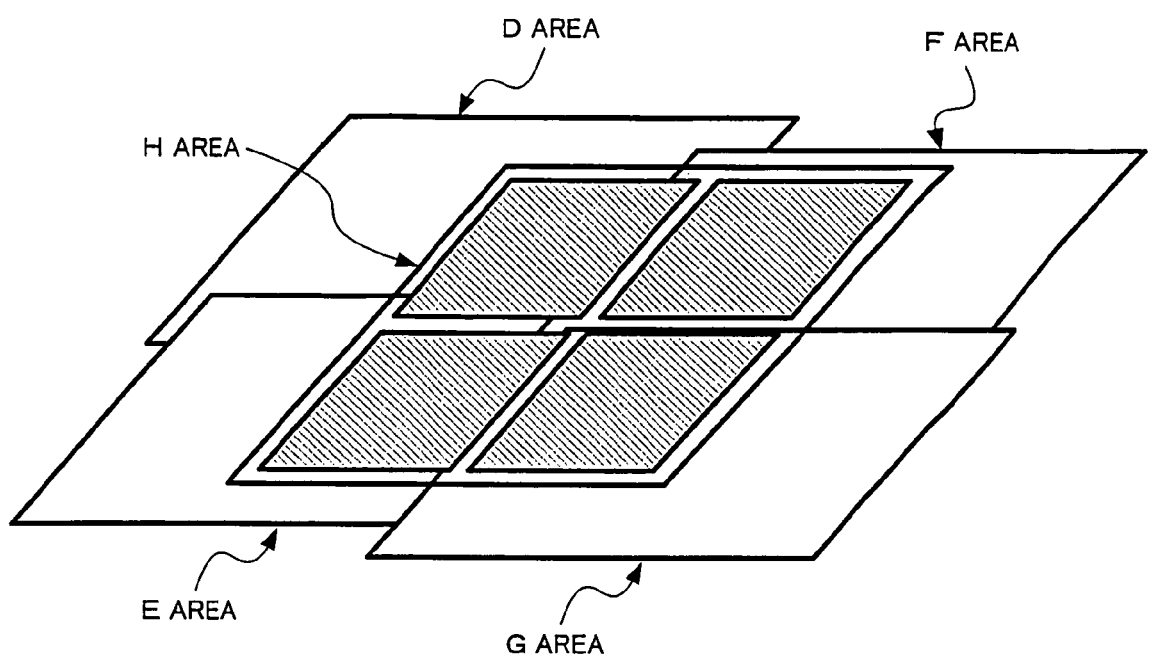
FIG. 34 is a schematic view showing a relationship among a plurality of aerial image photographing ranges.

In this case, by executing orthorectification, for example, data of an H area can be obtained as shown in FIG. 34 by partially extracting data from a D area, an E area, an F area and a G area and linking the extracted data.

Simply linking aerial image data yet to be subjected to orthorectification results in having an image which is not continuous at a linkage of the aerial image data due to inclination of aerial image data caused by central projection.

In this case, an image is formed, for example, in which an inclination of a structure differs in left and right with a linkage at the center, which is an unnatural image, so that it is impossible to execute alteration discriminating processing to high precision.

On the other hand, when linking the aerial image data by executing orthorectification as in the present embodiment, because the problem of image inclination is eliminated, the image will be continuous at a linkage of aerial image data to enable generation of a natural image.

In this case, more specifically, the photographing range adjustment unit 56 receives input of a plurality of ortho-image data of a new time point, a plurality of ortho-image data of an old time point, a plurality of ortho-DSM data of the new time point and a plurality of ortho-DSM data of the old time point, and by extracting, from among the respective data applied, data within a range of predetermined actual coordinates (proper position) and linking the plurality of extracted data, extracts data corresponding to the range of the predetermined actual coordinates (proper position), outputs each ortho-image data extracted to the color difference calculation unit 51 and outputs each ortho-DSM data extracted to the height difference calculation unit 52.

Although a range of predetermined actual coordinates (proper position) here represents a separately provided range of actual coordinates (proper position) common to each data, it can be not a common range of actual coordinates (proper position) provided separately but a range obtained by adjusting, to a range of actual coordinates (proper position) of any one of ortho-image data of a new time point, ortho-image data of an old time point, ortho-DSM data of a new time point and ortho-DSM data of an old time point, other.

(Operation of Third Embodiment)

Operation of the present embodiment, when the photographing range adjustment unit 56 obtains a range of actual coordinates (proper position) common to each data applied, differs from the operation of the first embodiment in that it receives input of ortho-image data of a new time point, ortho-image data of an old time point, ortho-DSM data of the new time point and ortho-DSM data of the old time point to obtain a range of actual coordinates (proper position) common to all the data applied between Step S401 and Step S402 in the first embodiment shown in FIG. 4, and the processing is executed by using the obtained range, and is the same as the operation of the first embodiment in the following processing.

Operation of the present embodiment, when the photographing range adjustment unit 56 extracts data within a range of predetermined actual coordinates (proper position) from among each data applied to link a plurality of extracted data, differs from the operation of the first embodiment in that it receives input of a plurality of ortho-image data of a new time point, a plurality of ortho-image data of an old time point, a plurality of ortho-DSM data of the new time point and a plurality of ortho-DSM data of the old time point to link the plurality of ortho-image data and ortho-DSM data within the range of predetermined actual coordinates (proper position) between Step S401 and Step S402 in the first embodiment shown in FIG. 4, and the processing is executed using the linked data, and is the same as the operation of the first embodiment in the following processing.

(Effects of Third Embodiment)

According to the third embodiment described in the foregoing, it is possible to discriminate an alteration of a feature on the earth by the same method as that of the first embodiment even when only parts of photographing ranges of aerial photographs taken at a new time point and an old time point are coincident.

The reason is that since the photographing range adjustment unit 56 receives input of ortho-image data of a new time point, ortho-image data of an old time point, ortho-DSM data of a new time point and ortho-DSM data of an old time point to obtain a range of actual coordinates (proper position) common to all the data applied by absolute orientation, only a common part of photographing ranges of the aerial photographs taken at the new time point and the old time point can be extracted, so that a feature on the earth can be compared in the common part at the new time point and the old time point.

Further according to the third embodiment, it is possible to discriminate an alteration of a feature on the earth by the same method as that of the first embodiment even when photographing ranges of a plurality of aerial photographs taken at a new time point and an old time point fail to completely coincide.

The reason is that since the photographing range adjustment unit 56, at both new and old time points, extracts ortho-image data and ortho-DSM data within a range of actual coordinates (proper position) set in advance from a plurality of ortho-image data and a plurality of ortho-DSM data by absolute orientation and links the same, comparison between features on the earth at the new time point and the old time point can be made using ortho-image data and ortho-DSM data in a range of arbitrary actual coordinates (proper position).

(Other Embodiments)

Although the present invention has been described with respect to the plurality of embodiments and modification examples in the foregoing, the present invention is not limited to the above-described embodiments and modification examples and can be implemented in various forms within the scope of its technical idea.

More specifically, the above-described alteration discriminating processing executed by the difference data discrimination unit 53 is one example of alteration to be discriminated by combining color difference data and height difference data and the processing is not limited to the above-described alteration discriminating processing by the above combination.

In addition, although one example of each kind of alteration discriminating processings has been described, the difference data discrimination unit 53 may execute discrimination by any combination of these alteration discriminating processings. It is for example possible to execute alteration discriminating processing only with respect to new construction and destruction or execute alteration discriminating processing with the effects of snow or shadow removed in addition to all the discriminations of new construction, destruction, expansion, reduction and unknown.

Furthermore, while in the present embodiment, alteration is discriminated by using aerial images of two, new and old, time points, the number of time points is not limited to two and alteration discrimination can be made using aerial images of three or more time points.

Moreover, although as an example of an object as an image, features on the earth have been described, objects are not limited to features on the earth and they can be any objects included in image data obtained by photographing a predetermined region.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A change discrimination device for discriminating, from image data obtained by photographing a predetermined region, a change of a target included in said predetermined region, comprising:
    a stereo processing unit which executes stereo processing with a plurality of images of a predetermined region as an input which are photographed at a plurality of different spots at a first time point and a second time point after the first time point to extract three-dimensional data of said first time point and said second time point;
    an orthorectification unit which, using the three-dimensional data of the first time point and said second time point extracted by said stereo processing unit, executes orthogonal projective transformation of the images photographed respectively on a same position for the first and second time point and said three-dimensional data at said first time point and said second time point to extract ortho-images and ortho three-dimensional data of said first time point and said second time point; and
    a change discrimination unit which discriminates a change of said target based on the ortho-images and said ortho three-dimensional data of said first time point and said second time point which are extracted at said orthorectification unit,
    wherein said change discrimination unit comprises:
    a color difference calculation unit which compares colors or tones of the ortho-image of said first time point and the ortho-image of said second time point, and obtains a difference in colors or tones as to each corresponding pixel of the ortho-image of said first time point and the ortho-image of said second time point,
    a height difference calculation unit which compares heights of the ortho three-dimensional data of said first time point and the ortho three-dimensional data of said second time point, and obtains a height difference as to each corresponding pixel of the ortho three-dimensional data of said first time point and the ortho three-dimensional data of said second time point, and
    a difference data discrimination unit which discriminates the change of said target included in said predetermined region based on the difference in colors or tones and the height difference,
    wherein said color difference calculation unit calculates difference value between a mean value of each color component of the ortho-image of said first time point and the ortho-image of said second time point, and rectifies a color of the ortho-image of said second time point by subtracting the difference value of each color component from each color component of all the pixels of ortho-image data of the ortho-image of said second time point.

2. The change discrimination device as set forth in claim 1, wherein said height difference calculation unit calculates height difference value between a mean value of a height of the ortho three-dimensional data of said second time point, and with respect to all the pixels of the ortho three-dimensional data of said second time point, rectifies a height of the ortho three-dimensional data of said second time point by subtracting the height difference value.

3. The change discrimination device as set forth in claim 1, wherein said change discrimination unit compares heights of the ortho three-dimensional data of said first time point and the ortho three-dimensional data of said second time point and compares an altitude of a ground surface and said heights to discriminate a change of said target.

4. The change discrimination device as set forth in claim 1, wherein
    said change discrimination unit
    compares colors or tones of the ortho-image of said first time point and the ortho-image of said second time point to extract color comparison data,
    compares heights of the ortho three-dimensional data of said first time point and the ortho three-dimensional data of said second time point to extract height comparison data, and
    integrates said color comparison data and said height comparison data to discriminate a change of said target.

5. The change discrimination device as set forth in claim 1, wherein said change to be discriminated by said change discrimination unit is one of or a combination of the following states:
    a state where no target exists at the first time point and a target exists at the second time point,
    a state where a target exists at the first time point and no target exists at the second time point,
    a reform state including expansion, modification/reform, repainting of a rooftop and new construction after destruction of a target at the first time point and the second time point,
    a state where a target exists at the first time point and a target higher than a target of the first time point exists at the second time point,
    a state where a target exists at the first time point and a target lower than a target of the first time point exists at the second time point,
    a state where a change is possible but no discrimination of a change is possible,
    a state where no target exists at the first time point and probability of a target existing at the second time point is high,
    a state where a target exists at the first time point and probability of no target existing at the second time point is high,
    a state where no target exists at the first time point and probability of a target existing at the second time point is low, and
    a state where a target exists at the first time point and probability of no target existing at the second time point is low.

6. The change discrimination device as set forth in claim 1, wherein said change discrimination unit discriminates a pixel in which a hue and a luminance of said image or said ortho-image are within a fixed range as a range where snow exists to exclude the discriminated range from a range whose change is to be discriminated.

7. The change discrimination device as set forth in claim 1, wherein said change discrimination unit discriminates a pixel in which a hue and a luminance of said image or said ortho-image are within a fixed range as a range where shadow exists to exclude the discriminated range from a range whose change is to be discriminated.

8. The change discrimination device as set forth in claim 4, wherein said change discrimination unit calculates an index for quantitatively evaluating a discriminated change by using said color comparison data and said height comparison data.

9. The change discrimination device as set forth in claim 8, wherein said change discrimination unit calculates, as said index for quantitatively evaluating a discriminated change, probability of a change of said target whose change is discriminated by using said color comparison data and said height comparison data based on a ratio of a region where said change occurs in said target.

10. The change discrimination device as set forth in claim 1, wherein said change discrimination unit, with regions having similar features as one unit as a discrimination target, discriminates a change on said region basis based on map data or said ortho-image or said ortho three-dimensional data.

11. The change discrimination device as set forth in claim 1, wherein said change discrimination unit discriminates a change of said target by at least making resolutions of the ortho three-dimensional data of said first time point and the ortho three-dimensional data of said second time point be coincident or resolutions of the ortho-image of said first time point and the ortho-image of said second time point be coincident.

12. The change discrimination device as set forth in claim 1, wherein with respect to images photographed at said first time point and said second time point, resolutions of the image of said first time point and the image of said second time point are made coincident,
said stereo processing unit extracts said three-dimensional data from the image of said first time point and the image of said second time point whose resolutions are coincident,
said orthorectification unit extracts said ortho-image and said ortho three-dimensional data from said images whose resolutions are coincident and said three-dimensional data extracted by said stereo processing unit, and
said change discrimination unit discriminates a change of said target based on said ortho-image and said ortho three-dimensional data extracted by said orthorectification.

13. The change discrimination device as set forth in claim 1, wherein said change discrimination unit discriminates a change of said target by at least obtaining a common photographing range in the ortho three-dimensional data of said first time point and the ortho three-dimensional data of said second time point or obtaining a common photographing range in the ortho-image of said first time point and the ortho-image of said second time point.

14. The change discrimination device as set forth in claim 1, wherein said change discrimination unit discriminates a change of said target by at least linking predetermined ranges in a plurality of ortho three-dimensional data of said first time point and linking predetermined ranges in a plurality of ortho three-dimensional data of said second time point to compare said ranges linked to each other or discriminates a change of said target by linking predetermined ranges in the ortho-image of said first time point and linking predetermined ranges in the ortho-image of said second time point to compare said ranges linked to each other.

15. The change discrimination device as set forth in claim 1, wherein said target is a feature on the earth included in said region.

16. The change discrimination device as set forth in claim 15, wherein said change to be discriminated by said change discrimination unit is one of or a combination of the following states:
a new construction state where no feature on the earth exists at the first time point and a feature on the earth exists at the second time point,
a destruction state where a feature on the earth exists at the first time point and no feature on the earth exists at the second time point,
a reform state including expansion/reform, repainting of a rooftop and new construction after destruction of a feature on the earth at the first time point and the second time point,
an expansion state where a feature on the earth exists at the first time point and a feature on the earth taller than a feature on the earth at the first time point exists at the second time point,
a destruction state where a feature on the earth exists at the first time point and a feature on the earth lower than a feature on the earth at the first time point exists at the second time point,
an unknown state where an alteration is possible but no alteration of a feature on the earth can be discriminated due to the effects of other feature on the earth,
a new construction state where no feature on the earth exists at the first time point and probability of a feature on the earth existing at the second time point is high,
a destruction state where a feature on the earth exists at the first time point and probability of no feature on the earth existing at the second time point is high,
a new construction state where no feature on the earth exists at the first time point and probability of a feature on the earth existing at the second time point is low, and
a destruction state where a feature on the earth exists at the first time point and probability of no feature on the earth existing at the second time point is low.

17. A change discrimination method of a change discrimination device for discriminating, from image data obtained by photographing a predetermined region, a change of a target included in said predetermined region, comprising the steps of:
a stereo processing unit of said change discrimination device executes a stereo processing step of executing stereo processing with a plurality of images of a predetermined region as an input which are photographed at a plurality of different spots at a first time point and a second time point after the first time point to extract three-dimensional data of said first time point and said second time point;
an orthorectification unit of said change discrimination device executes an orthorectification step of, using the three-dimensional data of the first time point and said second time point extracted at said stereo processing step, executing orthogonal projective transformation of the images photographed respectively on a same position for the first and second time point and said three-dimensional data at said first time point and said second time point to extract ortho-images and ortho three-dimensional data of said first time point and said second time point; and
a change discrimination unit of said change discrimination device executes a change discrimination step of discriminating a change of said target based on the ortho-images and said ortho three-dimensional data of said first time point and said second time point extracted at said orthorectification step, wherein said change discrimination unit executes a color difference calculation step of comparing colors or tones of the ortho-image of said first time point and the ortho-image of said second time point, and obtaining a difference in colors or tones as to each corresponding pixel of the ortho-image of said first time point and the ortho-image of said second time point, a height difference calculation step of comparing heights of the ortho three-dimensional data of said first time point and the ortho three-dimensional data Of said second time point, and obtaining a height difference as to each corresponding pixel of the ortho three-dimensional data of said first time point and the ortho three-dimensional data of said second time point, and a difference data discrimination step of discriminating the change of said target included in said predetermined region based on the difference in colors or tones and the height difference, wherein at said color difference calculation step, calculates difference value between a mean value of each color component of the ortho-image of said first time point and the ortho-image of said second time point, and rectifies a color of the ortho-image of said second time point by subtracting the difference value of each color component from each color component of all the pixels of ortho-image data of the ortho-image of said second time point.

18. The change discrimination method as set forth in claim 17, wherein at said height difference calculation step, calculates height difference value between a mean value of a height of the or the three-dimensional data of said second time point, and with respect to all the pixels of the ortho three-dimensional data of said second time point, rectifies a height of the ortho three-dimensional data of said second time point by subtracting the height difference value.

19. The change discrimination method as set forth in claim 17, wherein at said change discrimination step, heights of the ortho three-dimensional data of said first time point and the ortho three-dimensional data of said second time point are compared and an altitude of a ground surface and said heights are compared to discriminate a change of said target.

20. The change discrimination method as set forth in claim 17, wherein at said change discrimination step, colors or tones of the ortho-image of said first time point and the ortho-image of said second time point are compared to extract color comparison data, heights of the ortho three-dimensional data of said first time point and the ortho three-dimensional data of said second time point are compared to extract height comparison data, and said color comparison data and said height comparison data are integrated to discriminate a change of said target.

21. The change discrimination method as set forth in claim 17, wherein said change to be discriminated at said change discrimination step is one of or a combination of the following states:

a state where no target exists at the first time point and a target exists at the second time point, a state where a target exists at the first time point and no target exists at the second time point, a reform state including expansion, modification/reform, repainting of a rooftop and new construction after destruction of a target at the first time point and the second time point, a state where a target exists at the first time point and a target higher than a target of the first time point exists at the second time point, a state where a target exists at the first time point and a target lower than a target of the first time point exists at the second time point, a state where a change is possible but no discrimination of a change is possible, a state where no target exists at the first time point and probability of a target existing at the second time point is high, a state where a target exists at the first time point and probability of no target existing at the second time point is high, a state where no target exists at the first time point and probability of a target existing at the second time point is low, and a state where a target exists at the first time point and probability of no target existing at the second time point is low.

22. The change discrimination method as set forth in claim 17, wherein at said change discrimination step, a pixel in which a hue and a luminance of said image or said ortho-image are within a fixed range is discriminated as a range where snow exists to exclude the discriminated range from a range whose change is to be discriminated.

23. The change discrimination method as set forth in claim 17, wherein at said change discrimination step, a pixel in which a hue and a luminance of said image or said ortho-image are within a fixed range is discriminated as a range where shadow exists to exclude the discriminated range from a region whose change is to be discriminated.

24. The change discrimination method as set forth in claim 20, wherein at said change discrimination step, an index for quantitatively evaluating a discriminated change is calculated by using said color comparison data and said height comparison data.

25. The change discrimination method as set forth in claim 24, wherein at said change discrimination step, as said index for quantitatively evaluating a discriminated change, probability of a change of said target whose change is discriminated by using said color comparison data and said height comparison data is calculated based on a ratio of a region where said change occurs in said target.

26. The change discrimination method as set forth in claim 17, wherein at said change discrimination step, with regions having similar features as one unit as a discrimination target, a change is discriminated on said region basis based on map data or said ortho-image or said ortho three-dimensional data.

27. The change discrimination method as set forth in claim 17, wherein at said change discrimination step, a change of said target is discriminated by at least making resolutions of the ortho three-dimensional data of said first time point and the ortho three-dimensional data of said second time point be coincident or resolutions of the ortho-image of said first time point and the ortho-image of said second time point be coincident.

28. The change discrimination method as set forth in claim 17, wherein with respect to images photographed at said first time point and said second time point, resolutions of the image of said first time point and the image of said second time point are made coincident, at said stereo processing step, said three-dimensional data is extracted from the image of said first time point and the image of said second time point whose resolutions are coincident, at said orthorectification step, said ortho-image and said ortho three-dimensional data are extracted from said images whose resolutions are coincident and said three-dimensional data extracted at said stereo processing step, and at said change discrimination step, a change of said target is discriminated based on said ortho-image and said ortho three-dimensional data extracted at said orthorectification step.

29. The change discrimination method as set forth in claim 17, wherein at said change discrimination step, a change of said target is discriminated by at least obtaining a common photographing range in the ortho three-dimensional data of said first time point and the ortho three-dimensional data of said second time point or obtaining a common photographing range in the ortho-image of said first time point and the ortho-image of said second time point.

30. The change discrimination method as set forth in claim 17, wherein at said change discrimination step, a change of said target is discriminated by at least linking predetermined ranges in a plurality of ortho three-dimensional data of said first time point and linking predetermined ranges in a plurality of ortho three-dimensional data of said second time point to compare said ranges linked to each other or a change of said target is discriminated by linking predetermined ranges in the ortho-image of said first time point and linking predetermined ranges in the ortho-image of said second time point to compare said ranges linked to each other.

31. The change discrimination method as set forth in claim 17, wherein said target is a feature on the earth included in said region.

32. The change discrimination method as set forth in claim 31, wherein said change to be discriminated by said change discrimination unit is one of or a combination of the following states:

a new construction state where no feature on the earth exists at the first time point and a feature on the earth exists at the second time point, a destruction state where a feature on the earth exists at the first time point and no feature on the earth exists at the second time point, a reform state including expansion/reform, repainting of a rooftop and new construction after destruction of a feature on the earth at the first time point and the second time point, an expansion state where a feature on the earth exists at the first time point and a feature on the earth taller than a feature on the earth at the first time point exists at the second time point, a destruction state where a feature on the earth exists at the first time point and a feature on the earth lower than a feature on the earth at the first time point exists at the second time point, an unknown state where an alteration is possible but no alteration of a feature on the earth can be discriminated due to the effects of other feature on the earth, a new construction state where no feature on the earth exists at the first time point and probability of a feature on the earth existing at the second time point is high, a destruction state where a feature on the earth exists at the first time point and probability of no feature on the earth existing at the second time point is high, a new construction state where no feature on the earth exists at the first time point and probability of a feature on the earth existing at the second time point is low, and a destruction state where a feature on the earth exists at the first time point and probability of no feature on the earth existing at the second time point is low.

33. A non-transitory computer readable medium storing a change discrimination program thereon which runs on a computer device to discriminate, from image data obtained by photographing a predetermined region, a change of a target included in said predetermined region, which causes said computer device to execute processing of executing stereo processing with a plurality of images of a predetermined region as an input which are photographed at a plurality of different spots at a first time point and a second time point after the first time point to extract three-dimensional data of said first time point and said second time point, processing of, by using the extracted three-dimensional data of the first time point and said second time point, executing orthogonal projective transformation of the images photographed respectively on a same position for the first and second time point and said three-dimensional data at said first time point and said second time point to extract ortho-images and ortho three-dimensional data of said first time point and said second time point, and processing of discriminating a change of said target based on the ortho-images and said ortho three-dimensional data of said first time point and said second time point extracted, wherein said processing of discriminating a change of said target includes a color difference calculation processing of comparing colors or tones of the ortho-image of said first time point and the ortho-image of said second time point, and obtaining a difference in colors or tones as to each corresponding pixel of the ortho-image of said first time point and the ortho-image of said second time point, a height difference calculation processing of comparing heights of the ortho three-dimensional data of said first time point and the ortho three-dimensional data of said second time point, and obtaining a height difference as to each corresponding pixel of the ortho three-dimensional data of said first time point and the ortho three-dimensional data of said second time point, and a difference data discrimination processing of discriminating the change of said target included in said predetermined region based on the difference in colors or tones and the height difference, wherein at said color difference calculation processing, calculates difference value between a mean value of each color component of the ortho-image of said first time point and the ortho-image of said second time point, and rectifies a color of the ortho-image of said second time point by subtracting the difference value of each color component from each color component of all the pixels of ortho-image data of the ortho-image of said second time point.

* * * * *